United States Patent
Lipson et al.

(10) Patent No.: US 7,167,583 B1
(45) Date of Patent: Jan. 23, 2007

(54) IMAGE PROCESSING SYSTEM FOR USE WITH INSPECTION SYSTEMS

(75) Inventors: Pamela R. Lipson, Cambridge, MA (US); Aparna Ratan, Cambridge, MA (US); Chukka Srinivas, Malden, MA (US); Pawan Sinha, Cambridge, MA (US)

(73) Assignee: Landrex Technologies Co., Ltd., Taipei-Hsein (TW)

( * ) Notice: Subject to any disclaimer, the term of this patent is extended or adjusted under 35 U.S.C. 154(b) by 631 days.

(21) Appl. No.: 09/605,289

(22) Filed: Jun. 28, 2000

(51) Int. Cl.
G06K 9/00 (2006.01)

(52) U.S. Cl. ........................ 382/147; 382/149; 382/256; 361/720; 707/102

(58) Field of Classification Search ................ 382/147, 382/141, 145, 149, 148, 150, 151, 209, 218, 382/257, 289, 256; 361/715, 718, 719, 720, 361/722, 723, 807, 728; 701/59; 346/126, 346/87, 95, 135, 580, 583, 586; 707/102
See application file for complete search history.

(56) References Cited

U.S. PATENT DOCUMENTS

| | | | |
|---|---|---|---|
| 4,894,790 A | | 1/1990 | Yotsuya et al. |
| 5,008,743 A | | 4/1991 | Katzir et al. |
| 5,058,982 A | | 10/1991 | Katzir |
| 5,307,421 A | * | 4/1994 | Darboux et al. ............. 382/145 |
| 5,371,690 A | * | 12/1994 | Engel et al. ................ 382/151 |
| 5,450,201 A | | 9/1995 | Katzir et al. |
| 5,465,221 A | * | 11/1995 | Merat et al. .................. 702/83 |
| 5,542,600 A | | 8/1996 | Kobayashi et al. |
| 5,619,429 A | | 4/1997 | Aloni et al. |
| 5,619,588 A | | 4/1997 | Yolles et al. |
| 5,638,460 A | | 6/1997 | Nishimori et al. |
| 5,699,447 A | | 12/1997 | Alumot et al. |
| 5,764,536 A | | 6/1998 | Yamamoth et al. |
| 5,793,901 A | | 8/1998 | Matsutake et al. |
| 5,848,189 A | | 12/1998 | Pearson et al. |
| 5,963,662 A | | 10/1999 | Vachtsevanos et al. |
| 5,982,927 A | * | 11/1999 | Koljonen ..................... 382/168 |
| 5,987,191 A | | 11/1999 | Suzuki |

(Continued)

OTHER PUBLICATIONS

Reinholt Geelink et al. "unified teature defination for feature based design and feature based manufacturing", University of Twente Department of Mechanical Engineering Laboratory of Production and Design Engineering Enschede, The Netherlands.*

*Primary Examiner*—Sheela Chawan
(74) *Attorney, Agent, or Firm*—MacPherson Kwok Chen & Heid LLP

(57) ABSTRACT

An inspection system includes a plurality of models are applied in a way that enhances the effectiveness of each type of model. In one embodiment, a printed circuit board inspection system includes an image model, a structural model and a geometric model to inspect objects. The image model is first applied to an object being inspected to identify objects which look alike. After the image model is applied, a structural model is applied to determine whether the object exists in the image that has the same structure and is used to decide if the image model has truly found a part in the image. Lastly, a geometric model is applied and uses the approximate positional data provided by the previous two models to determine precisely the location of the object being inspected. Also described are techniques for learning and updating the plurality of models.

34 Claims, 23 Drawing Sheets

U.S. PATENT DOCUMENTS 6,317,513 B2 * 11/2001 Michael et al. ............. 382/145
6,324,298 B1 * 11/2001 O'Dell et al. ............... 382/149
6,539,106 B1 * 3/2003 Gallarda et al. ............ 382/149

* cited by examiner

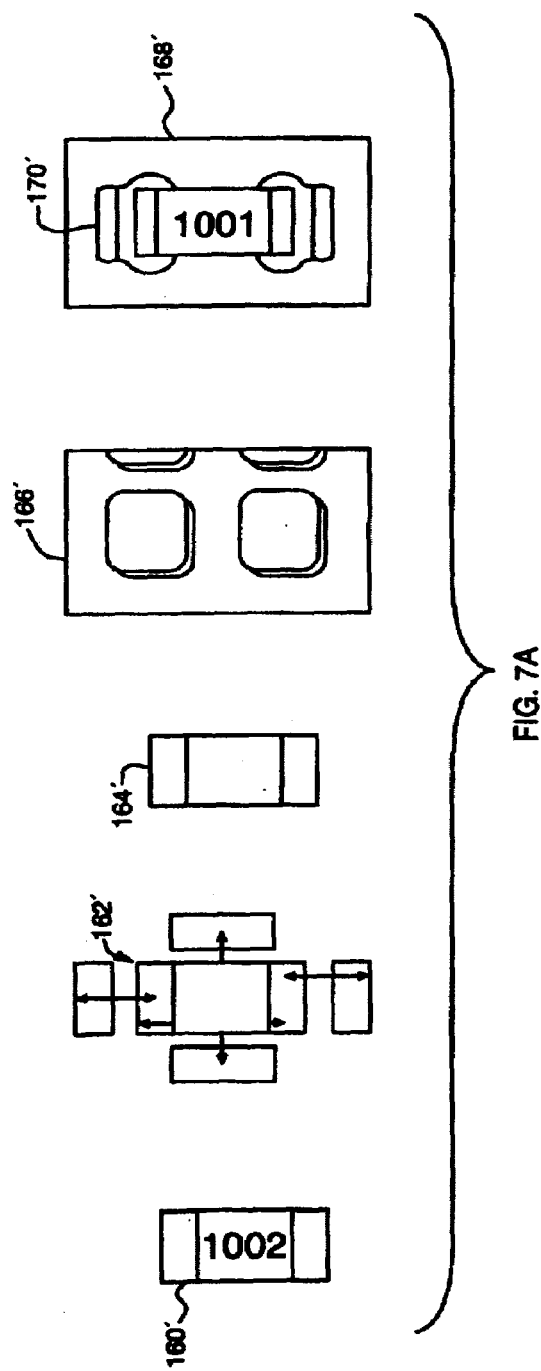

IMAGE PROCESSING SYSTEM FOR USE WITH INSPECTION SYSTEMS

STATEMENTS REGARDING FEDERALLY SPONSORED RESEARCH

Not applicable.

CROSS-REFERENCE TO RELATED APPLICATIONS

Not applicable.

FIELD OF THE INVENTION

This invention relates generally to image processing systems and more particularly to image processing systems for use with inspection systems including inspection systems used to inspect printed circuit boards.

BACKGROUND OF THE INVENTION

As is known in the art, an inspection system refers to a system used to inspect any real world process, device or object. An Automated optical Inspection System (AOI) performs inspections largely without human intervention. AOIs may take a variety of shapes and configurations depending upon the particular application in which they are used. Typically, however, such systems include one or more sensors which are mounted within a fixture (sometimes referred to as an inspection head). The inspection head is adapted for controlled movement relative to the object being inspected. Each of the one or more sensors captures an image of the object (or part of the object) being inspected and provides the captured image to an image processing system. The most typical type of sensors are cameras that are sensitive to the visible lights spectrum. Others, for instance, are sensitive to X-Rays. The image processing system compares the captured image of the actual object being inspected to a software model of objects of that type. Based upon the results of the comparison, the inspection system provides an indication of how well the captured image matched the model. Thus, the inspection system uses models in the inspection process.

As is also known, a software model or more simply, a model, is a representation of a real world process, device or concept which has been "realized" or "represented" in a software. The model thus provides a representation of selected or entire aspects of a structure, behavior or operation or other characteristic of a real world process, concept or system. The real world process, device or concept is referred to as an object class.

In order to generate a model, one must first identify an object class and then select attributes of the object class to be encoded in the model. The object class thus typically includes a group of objects or instances of objects which share one or more characteristics or attributes.

It is generally desirable to select for inclusion in the models those attributes which can concisely summarize the object class and which allow an inspection system using a model which includes these attributes to identify particular objects as "true positives" and to distinguish other objects which are not part of the class as "true negatives." Since there are many attributes from which to choose for inclusion in the model and since some attributes result in the model, when applied, having a high rate of success in identifying "true positives" and distinguishing "true negatives", it is difficult to determine which attributes to include in the model. The problem becomes more difficult when we cannot determine which attributes allow an inspection system to distinguish true positives from true negatives. In addition, if we have a hypothesis about what attributes to include, we may not know how to measure or represent them.

An object which is labeled as "true positive" is an object which properly belongs to a particular object class with which the object is being compared. For example, if the object class is integrated circuit package types and the object is an integrated circuit, then the integrated circuit would be considered a true positive with respect to the integrated circuit object class.

An object which is a "true negative," on the other hand, is an object which does not properly belong to a particular object class with which the object is being compared. For example, assume the object class is integrated circuit package types and the object is a lumped element resistor. In this case, the lumped element resistor would be considered a true negative with respect to the integrated circuit object class because a lumped element resistor does not belong to the same object class as objects having integrated circuit package types.

In order to match a model to an object to determine if it is part of the object class, a matching method is used. The matching method extracts the chosen attributes from the object being inspected and compares the measured attributes of that particular object to the attributes of the object class as stored in the model. One important aspect of the matching method is that it correctly calculate or determine the value of the attributes from the object being inspected. These calculated or selected attributes are then compared to the model attributes. One example of an attribute used to model components on a printed circuit board are the part boundary edges with the printed circuit board and any internal edges of the component. Given an image that may contain a part, large image gradients or discontinuities are considered as potential "edge candidates" that are the result of the placement of the component on the board.

One problem with this approach, however, is that many matching methods are not able to correctly determine, or determine in a realistic amount of time, which data from the image which contains the object being inspected should be included in an attribute measurement. This dilemma is often called the correspondence problem. When a precise correspondence is necessary between the measured data from the image of object being inspected and the model attributes but the data is ambiguous with respect to a particular attribute, match methods tend to yield poor results. In the worst case, if there are n attribute candidate measurements in the image and m attribute measurements in the model of the part, there are m^n possible combinations. Often all must be evaluated to choose the best correspondence. Even then a true match may not exist if one of the critical attribute measurements in the image was not measured properly.

As is also known in the art, conventional printed circuit board (PCB) inspection techniques typically use only a single type of model having a single attribute. Also, conventional inspection systems use a single matching method. Most model matching schemes compute instances of attributes in the image and compare them to all instances attributes in the model. As described above, the number of correspondences that must be evaluated is exponential. Many techniques try to refine this set by ruling out combinations that are unlikely or that violate some heuristically generated rules.

Different types of models are also known. One type of model referred to as an image model is generated from an image of an instance of object being inspected. In practice, the model is often derived or built from an image of a sample or a typical one of the objects to be inspected. The sample or typical object may be that of an entire circuit component or a portion of a circuit component or from a portion of a PCB to be inspected. The image model typically includes only a single attribute, for example, luminance. The luminance distribution is arranged in a fixed spatial configuration. A matching method is used to translate the image of the object being inspected (e.g. the component or the portion of the circuit being inspected) into a set of attributes like those included in the model. For example, if luminance attributes are included in the image model, then the matching method generates a set of luminance attributes from the object being inspected. The single image model is then used to perform an inspection process. One problem with the image model technique, however, is that if the appearance of true positives changes over particular instances of the object(s) to be inspected, the image models tend to be a poor representation of the actual data. That is, the image of the circuit component or PCB from which the single image model is provided may not be an accurate representation of a typical circuit component or PCB being inspected during the inspection process. It also may not be a good representation of a typical circuit component which may have several acceptable appearances. Consequently, the image model will not accurately match images of the circuit components or PCBs being inspected and thus the inspection system using the image model will not yield accurate test results.

Another type of model referred to as an edge model is often provided from an idealized edge representation of the component or a circuit portion of a circuit to be inspected. A matching method is used to translate the image of the object being inspected (e.g. the component or the portion of the circuit being inspected) into a set of edge attributes. One problem with this approach, however, is that a new image to be inspected may include many edges. In such a case, it may be unclear which set of edges to use to match the new data from an object being inspected to the set of edges or lines in the model thus making it difficult to measure the corresponding features in the new image and in the model. It is also possible that due to poor lighting conditions, camera noise, low contrast between the object and the background, or numerous other conditions, the image processing system was not able to discern a true component edge. When the matching method has not accurately translated the image circuit components into the desired attributes, the inspection system will not yield accurate test results.

When the models do not yield accurate test results, the inspection system provides a significant number of "false positives" and a significant number of "false negatives". In the printed circuit board inspection context, a "false positive" means that the inspection system indicates that a circuit component is present on a PCB when the circuit component actually is not present. Similarly, a "false negative" means that the system indicates that a circuit component is not present on a PCB when the circuit component actually is present.

Automated optical inspection of PCBs is relatively difficult for a variety of reasons. For example, circuit components having a dark color can be disposed on PCBs having a dark color. Thus, in this case a camera does not detect any significant contrast between the circuit component and the PCB due to a dark part (i.e. the circuit component) being disposed on a dark background (i.e. the PCB).

Also, PCB's can include "false edges" which are due to silk screening processes used on the PCB, as well as false negatives and positives which are due to the high amount of variability in component and printed circuit board appearance, Such variations also make it difficult for inspection systems to consistently recognize parts on the PCB.

It is undesirable to have false negatives because it is time consuming for a human to look at and dismiss these failure conditions. It is undesirable to have and false positives since it is time consuming and expensive to later determine that circuit components are not there or are faulty. Thus, inspection systems utilizing the single model and matching method approach typically result in increased PCB manufacturing costs and reduce the rate at which the PCBs can be manufactured.

It would, therefore, be desirable to provide an inspection system and technique which results in relatively few false positives and false negatives. It would also be desirable to provide a technique which increases the capacity/rate at which PCBs can be manufactured and which processes images of printed circuit components relatively rapidly. It would be further desirable to provide a system which produces results which are both reproducible and repeatable.

SUMMARY OF THE INVENTION

In view of the above problems and limitations of existing inspection systems, including printed circuit board inspection systems, and in accordance with the present invention, it has been recognized that combining the need for accurate inspection test results with the usefulness and desirability of performing rapid image analysis can be achieved by the use of a plurality of different types of models. This, in turn, leads to the problem of how to select and utilize the plurality of model types to reduce the number of false positives and false negatives while at the same time increasing the speed with which the circuit components or PCBs are inspected.

It has also been recognized that models which include only a single attribute typically do not provide a good representation of the data generated during the inspection process. A further problem with prior art techniques is that the attributes used for a particular model representation often cannot be easily measured in an image captured by a camera or sensor. The attributes are often measured during the matching process. In either case, (i.e. if the model is either not a good representation of the data or the attributes used for a particular model representation cannot be easily measured in the image), then the model/matching approach will have false calls. It has thus also been recognized that limiting the manner in which the models are utilized results in an inspection system having a reduced number of false positives and false negatives.

The use of several types of models is effective when we can break down the general problem into smaller, easier to handle questions. Each model in term is not forced to solve the whole problem, therefore, making the model's output more robust.

Thus, in accordance with the present technique, an inspection system utilizes an image model, a structural model and a geometric model to inspect objects. The three model types are combined in a way that uses the strengths of each type of model. The image model is first applied to an object being inspected to determine if the part being inspected "looks exactly like" parts that have been seen in the past. This use is to be distinguished, for example, from using the image model to determine whether an object being inspected is present. Use of the image model in accordance with the present invention provides a relatively rapid technique for identifying objects which look alike. The attributes included in the image model can correspond to color, luminance, or other derived attributes that are arranged in a fixed spatial manner. After the image model is applied, a structural model is applied. The structural model encodes a set of regions and relations. Its job is to determine whether a part exists in the image that has the same structure as that encoded in the model. The structural model can be used to decide if the image model has truly found a part in the image Thus, in one case it is being used for verification. In another, case, if the image model fails, it can check to see if a part with very different visual characteristics but similar structure to the model exists in the image. Last, a geometric model is applied. The assumption is made with the geometric model that the part or object is already known to be in place but the details of the placement are needed. From the rough location and rotation data provided by the previous two models it determines a precise location of the part or object being inspected. The geometric model searches for all edges or large gradient regions of the object substantially simultaneously with the constraint that the pattern of gradients match a "top level" configuration of overall shape. The geometric model utilizes strong gradients in luminance, color, etc. . . . to precisely locate the part or object being inspected.

With this particular arrangement, a model/matching approach having fewer false fails and more precise localization than prior art techniques is provided. By utilizing plural models in a single inspection system, the advantages of each model type can be exploited while the disadvantages of each model type can be reduced or in some cases even eliminated In accordance with a further aspect of the present invention, a method of matching an image of an object to be detected with one or more of multiple models includes the steps of applying an image model to a region of interest to determine if the object is present with a similar appearance to the model, applying a structural model to the region of interest to confirm that the object is present and to more precisely locate the object or to determine if an object with similar structure, but a different acceptable appearance to the model is present and applying a geometric model to the region of interest to locate precise boundaries of the object.

In accordance with a further aspect of the present invention, a method for inspecting an object includes the steps of applying the first model to a region of interest around the expected location of an object to generate an output region of interest and applying the second model to the region of interest output by the first model. The first model reduces the number of parameters or the size of the region of interest which must be considered during a matching process by the second model. For example, in a printed circuit board application applying an image model prior to the structural model can reduce the number of rotations and translations of an object which must be considered by the structural model during a matching process. Similarly, application of the structural model prior to the geometric model can reduce the number of rotations and translations of an object which must be considered by the geometric model. This results in a relatively rapid matching process.

Stated differently, the chain of application of models (i.e. applying one model after another in a series) may be used to reduce the number of hypotheses considered by each model. It should be appreciated that as used in this context, the term parameters is intended to include all hypotheses considered by a model. In the above example, the hypotheses are directed toward recovering the rotation and translation values of an object being inspected. Thus, the range of possible rotations and translations to be considered is reduced as each model is successively applied. In another application, however, the hypotheses may be related to which object is in the image. For instance, for a surveillance application the set of hypotheses could cover all types of mobile vehicles present in an image. The objects that may be present include a tank, truck, van, car, motorcycle or bicycle. Given a real image, we can use a chain of models to systematically reduce the number and type of possible vehicles in the image. In a further instance, the hypothesises are directed toward recovering the luminance or color of an object. This is commonly done in medical image processing to make a diagnosis about a medical condition such as osteoporosis or a blood disorder or a brain tumor. Multiple models used in succession can be used to eliminate possible color or luminance values.

With this particular technique, a robust recognition method for matching an image of an object to be detected with a model is provided. By first applying the image model then the structural model and then the geometric model, a rapid accurate inspection process is provided. By presenting each model with a well-defined task to perform and a well defined question to answer, the strengths of each model can be used to rapidly obtain accurate information. The information obtained by application of each model is used by the inspection system to make a determination concerning an object being inspected.

In accordance with a further aspect of the present invention, an inspection system includes a database having stored therein a package library and an inspection plan, an inspection plan generator coupled to receive information from the database and information about the board to be inspected. The system further includes an image processing system including an image model processor, a structural model processor and a geometric model processor. The model processors cooperate to apply multiple models to an image of an object provided thereto. In one embodiment, the model processors cooperate to sequentially apply multiple models to the image of the object.

With this particular arrangement, an inspection system which utilizes multiple models during an inspection process (e.g. inspection of an object such as a printed circuit board component) and provides relatively few false positive and false negative results is provided. The particular number of models used in analyzing the image depends, at least in part, upon how well the image of the object being inspected matches each of the models and how varied the class of objects being inspected can be. By using a first model to hypothesize if a component is present and using additional models for verification and to determine more detailed information with respect to the component or to determine the location of the component with respect to another object, the system provides highly reliable and accurate results.

In accordance with a further aspect of the present invention, a process to inspect an object includes the steps of obtaining an image containing the object being inspected, obtaining image, structural and geometric models which correspond to the object type, applying the image model to the object, determining whether the image model indicates the part is present. In response to the image model indicating the object is present, searching with the structural model a small area in the ROI where the image model found the part. In response to the image model indicating it is not sure if the object is present, the structural model is used to completely search the entire ROI. If the structural model indicates that the part is then present, the geometry model is then used to precisely locate the object and to provide detailed information concerning the placement of the object.

With this particular arrangement, a multiple model inspection process is provided which can rapidly and accurately locate objects. By using the image, structural and geometric models in certain predetermined order, the advantages of each type of model can be highlighted while the deficiencies of each type of model can be reduced.

In accordance with a further aspect of the present invention, a process to inspect a printed circuit board includes the steps of populating a package library, annotating the library to include a visual class type, generating an inspection plan for a particular printed circuit board, inspecting the PCB using multiple models and optionally performing a background model learning step. With this particular arrangement, a process for inspecting printed circuit boards is provided. It should be appreciated that while the process is used to inspect PCBs, the same process can be used to inspect other types of objects.

In one embodiment, the process can include a debug mode which can be used to correct problems with any of the models in the inspection plan. It should be understood that in accordance with the present invention, each part has a set or group of models associated with it. For example, an image model, a structural model and a geometry model can form a model group for a particular part. If decision is made to enter a debug process then processing flows to a debug learning process. If a new model or set of models (e.g. image, structural or geometry models) for a component has been learned in a background model build step, those models can be substituted for one in the inspection plan. Otherwise, the learning steps for a particular model or set of models are repeated on a different set of images. The debug process concludes by updating the inspection plan which involves replacing the model or set of models for a problem component with a new "debugged" model or adding new instances of a model (e.g. a second image model). The debug and subsequent learning process results in a revised specific model or set of models for that part which the system identified as a problem part. After the new model or set of models is generated, the inspection plan for the problem component is updated. It should also be appreciated that one or all of the models in a model group can be updated or augmented. For example, in accordance with the debug/learn process, it is possible to learn a new image model, but keep the structural and the geometry models the same.

In accordance with a further aspect of the present invention, a technique for developing or learning models which can be used in a printed circuit board inspection system includes the steps of using a snapshot to build default image and structural models and using geometric information about the part to build a default geometric model of the object.

In one embodiment, a process for automatically cropping a snapshot is used. This process includes the steps of identifying a region of interest (ROI) on a PCB which should contain the object being inspected and matching the default image and structural models to the ROI to decide if the object is present. Note that since the image model requires a snapshot, the process may be boostrapped by using a synthetic snapshot (i.e. a synthetic image generated from data gathered from multiple images or automatically generated or combined to provide the synthetic image) or a snapshot of a similar part. If decision is made that the object is not present, then another ROI is provided and the above steps are repeated. If on the other hand, decision is made that the object is present, then the geometry model is used to locate the exact boundaries of the component and to provide rotation information concerning the object and a "cropped" image of the part is obtained. With this particular arrangement, a technique for automatically obtaining a cropped image which can be used to provide a model is provided.

Once the models have all of their basic elements, they are trained on examples to distinguish positive examples (images that contain the correct part) from negative example (images that do not contain a part or contain the wrong or damaged part). The number of examples can be as small as two (one positive and one negative) or as large as all of the data generated from printed circuit boards that have been previously inspected.

BRIEF DESCRIPTION OF THE DRAWINGS

The foregoing features of this invention, as well as the invention itself, may be more fully understood from the following description of the drawings in which:

FIGS. 7 and 7A show an image model, a structural model and a geometry model in nominal orientations as trained on captured image regions.

DETAILED DESCRIPTION OF THE INVENTION

Figure 1:
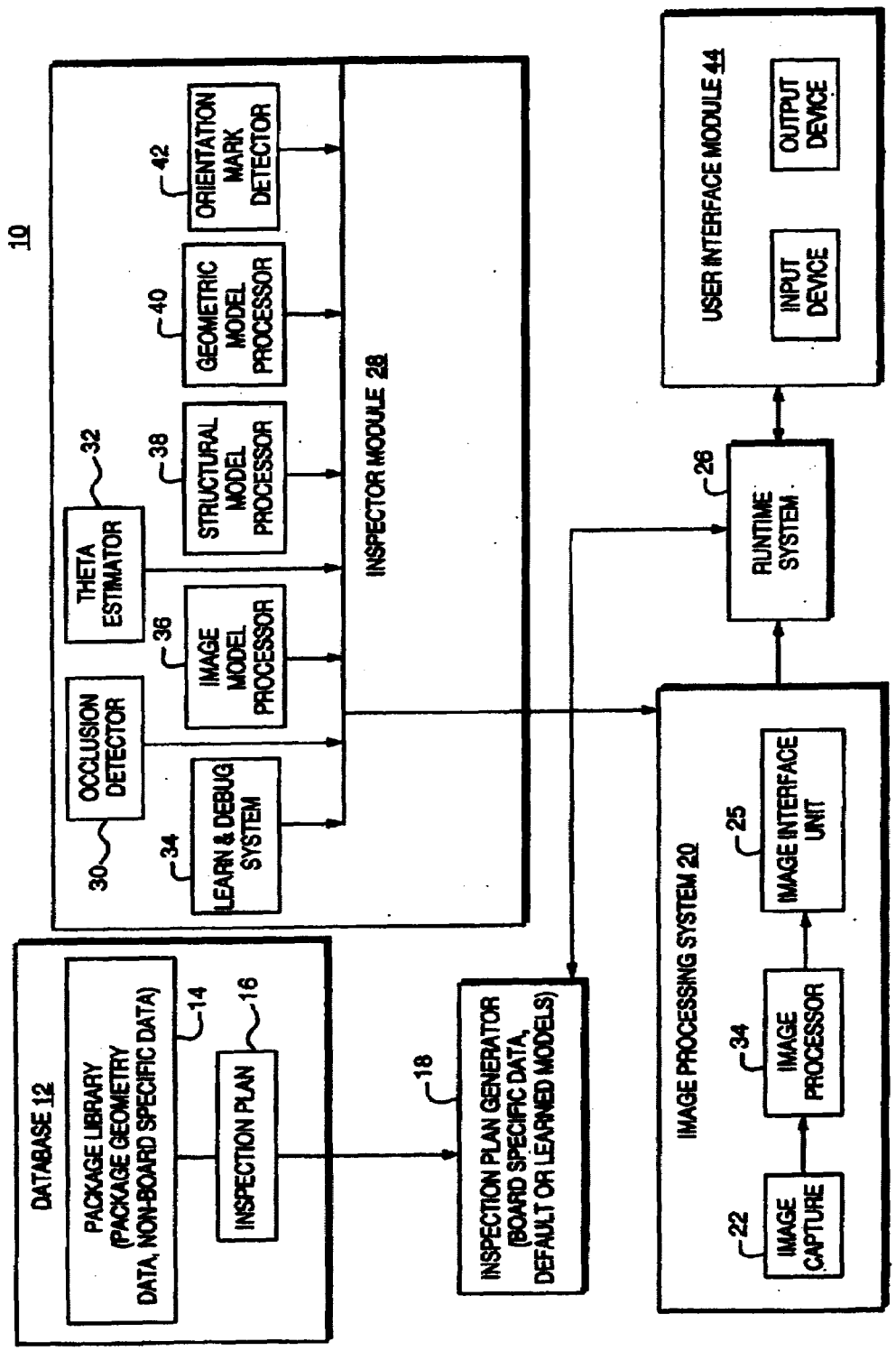
FIG. 1 is a block diagram of an inspection system.

Before describing the processing and apparatus of the present invention, it should be appreciated that, in an effort to promote clarity, reference is sometimes made herein to inspection of certain objects or inspections performed in a particular field of use. Such references and accompanying examples are only intended to facilitate an appreciation of the invention and should not be taken as limiting use of the concepts described herein to use with only systems of the type described herein. Rather, as mentioned above, the present invention finds application in a wide variety of different fields and generally finds application to the problem of object recognition or detection. The present invention can be used to recognize objects such as faces or to detect object such as wafer defects. Other areas include image database indexing, medical image analysis, and surveillance and monitoring applications.

Also in the description hereinbelow, reference is sometimes made to a system having a particular imaging system or imaging system components or a particular lighting system or lighting system components or lights which operate at particular frequency profiles or temperatures. Those of ordinary skill in the art will appreciate, of course, that the concepts described herein apply equally well to inspection systems having any type of imaging or lighting systems (including lighting systems operating over a wide range of frequency profiles) or components provided that the systems or components have the desired operational or functional characteristics. Reference is also sometimes made herein to a lighting system having lights disposed in a particular topology. Those of ordinary skill in the art will appreciate that the principles of the present invention can be implemented using a variety of light topologies and that those presented herein are only examples and should not be construed as limiting.

Reference is also sometimes made herein to inspection of certain objects such as printed circuit boards and circuit components disposed on printed circuit boards. As described herein, a circuit component or more simply a component, refers to a part such as an integrated circuit which is mounted or otherwise coupled to a printed circuit board (PCB). The object may also be a printed circuit board defect. The PCB may be of any type.

Those of ordinary skill in the art will appreciate that the principles of the present invention can find use in a variety of applications including, but not limited to, inspection of printed circuit boards and components as well as inspection of any other types of objects. For example, the present invention finds applications where one object is disposed over and possibly in contact with or in close proximity with another object or where one object is embedded in another object, or where it is desirable to identify a foreground object from a background in an image. Likewise, the techniques described herein may be used for any type of printed circuit board or circuit board component without regard to its function.

Accordingly, those of ordinary skill in the art will appreciate that the description and processing described herein as taking place on "printed circuit boards" and "components" could equally be taking place on a person's face or a fingerprint or a company logo or any other image. Likewise, the processors described hereinbelow may include any type of integrated circuit, hardwired or programmed to perform a particular task or function.

Referring now to FIG. 1, a processing system 10 for performing inspections of printed circuit boards (PCBs) includes a database component 12 having stored therein a package library 14 which contains detailed information concerning certain objects. For example, in the case of a PCB inspection system, the package library 14 includes detailed information concerning the shape and size of an integrated circuit does not include any information related to how the parts would be disposed on a PCB. The database 12 also includes an inspection plan library 16 which is coupled to an inspection plan generator 18 which generates an inspection plan for a particular PCB and stores the results of the inspection plan in the inspection plan library 16.

An image processing system 20 coupled to the database 12 includes an image capture system 22, an image processor 24 and an image interface unit 25. The image capture system 22 may be provided, for example, as one or more cameras or sensors which capture an image of an object to be inspected. In a preferred embodiment, the cameras correspond to color cameras. After the image is captured, there is subsequent processing on the data, such as Bayer color recovery, white balance, contrast enhancement, etc. . . . The image interface unit 25 may be provided as a graphical user interface (GUI) for example, through which a user can interface with the image processing system 20.

The images captured by the image capture system 22 are delivered to a runtime system 26. The runtime system 26 determines from the inspection plan 16 which parts to inspect in one camera field of view for a particular board type. The runtime system 26 also determines what parts need to be inspected over several camera fields of view (e.g. if the part crosses a camera frame boundary or a part is too big for one camera frame).

To inspect one particular part, the runtime system 26 invokes an inspector module 28. The inspector module 28 includes an occlusion detector 30, a theta estimator 32, a learn and debug system 34 an image model processor 36, a structural model processor 38 a geometric model processor 40 and an orientation mark detector 42. The runtime system 26 can invoke the inspector module 28 in an "inspect mode", a "learn mode", or a "debug mode." In both learn and debug modes, the system 10 will learn and save attributes about the appearance of parts and update or add to the corresponding image, structural and geometric models. The runtime system 26 can take input from a user via a user interface module. For instance, during a debug process, the user of the system can be asked questions via this user interface.

When the runtime system invokes the inspector module 28 in the inspect mode, an inspection process is initiated. The inspection process will be described in detail in conjunction with FIG. 5 below. Suffice it here to say the inspection system 10 utilizes a plurality of modules during the inspection process. In one embodiment, the inspection module 28 utilizes the image model 36, the structural model 38 and the geometric model 40 in a particular order to perform an inspection. Thus, the inspection system 10 utilizes an image model, a structural model and a geometric model to inspect objects.

The three model types are combined in a way that uses the strengths of each type of model. The image model 36 is first applied to a larger region of interest on the PCB to determine if there exists an object in this larger region of interest that looks extremely similar to the picture stored in the image model of an object being inspected to determine if the part being inspected "looks like" the image model. Such a use should be distinguished, for example, from conventional uses of image models in which the image model is used to determine whether an object being inspected is present in an image. Use of the image model in accordance with the present invention provides a relatively rapid technique for identifying objects which look very similar. The attributes included in the image model can correspond to color, luminance, etc. . . . It should be appreciated that an image model is usually a fixed pattern of binary, luminance, color pixels. Usually these pixels have a one to one correspondence to an imaged view of an object. However, an image model can also be a fixed pattern of processed image features, such as gradients or texture features. An image model may also exist at many different resolutions. A disadvantage of an image model is that many features on a bare or pasted board may look very similar to the features on an object.

After the image model 36 is applied to the image of the object being inspected, a structural model 38 is applied. Specifically, the structural model 38 is applied to make the decision of whether the object is truly present in the region of interest. If the image model indicates that it thinks the part is present at a particular location, the structural model checks to see if the indicated part has all of the structural features that should be present on the part. The structural model may be used to provide a closer approximation of the location of the object. If the image model indicates that it does not think a part similar to its internal image is present in the ROI. The structural model looks over the whole region for a part that looks different from the image model, but has the right structural components.

The output of the image and structural matching steps is an indication that either 1) the part is absent or 2) the part is present at rough location <x,y> with an estimate of rotation at r degrees. If the part is present, a geometric model is applied to determine precisely the location of the part or object being inspected.

Finally, a geometric model 40 is applied to determine precisely the location of the part or object being inspected. The geometric model searches for all edges of the object substantially simultaneously with the constraint that the edges match the "top level" model description. The assumption is made with the geometric model that the part or object is already known to be in a particular place and the geometric model 40 determines the exact details of the part or object placement. The geometric model utilizes strong gradients in luminance, color, etc. . . . to precisely locate the part or object being inspected. It should be appreciated that the geometric model can use features other than strong gradients. For example, it can analyze the image for regions containing inflection points, other geometric feature, and even image features, such as a distinct precisely positioned mark. Thus, use of the multiple models in the inspection system 10 results in the system 10 having increased speed, fewer false fails, and greater measurement resolution than prior art systems.

FIGS. 2–6A are a series of flow diagrams showing the processing performed by a processing apparatus which may, for example, be provided as part of the inspection system 10 (FIG. 1) to inspect printed circuit boards (PCBs). Alternatively, the processing steps may be implemented by an image processing system which simply matches images in a process other than PCB inspection. The rectangular elements (typified by element 54 in FIG. 2), are herein denoted "processing blocks," and represent computer software instructions or groups of instructions. The diamond shaped elements (typified by element 50 in FIG. 2), are herein denoted "decision blocks," and represent computer software instructions, or groups of instructions which affect the execution of the computer software instructions represented by the processing blocks.

Alternatively, the processing and decision blocks represent steps performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Some of the steps in the flow diagrams of FIGS. 2–6A below are described as non-board specific meaning that no information from any specific printed circuit board is needed in order to carry out the step. Other steps in the flow diagram are described as board specific meaning that at least some information about one or more specific printed circuit boards (or specific types of printed circuit boards) is needed in order to carry out the step. In particular, if a particular element or step performed during a process of inspecting a printed circuit board is said to be non-board specific, this indicates that these elements apply irrespective of what board is being built. Examples of non-specific board information include the size of the parts, the snapshot of a particular part, the default structural model and geometry model. Board specific information is used mostly in the training step where the models learn the difference between an instance of a part on paste in a region of interest and a region of interest with pasted or bare pads. Any step that requires contextual information about the part on the board is board specific.

Figure 2:
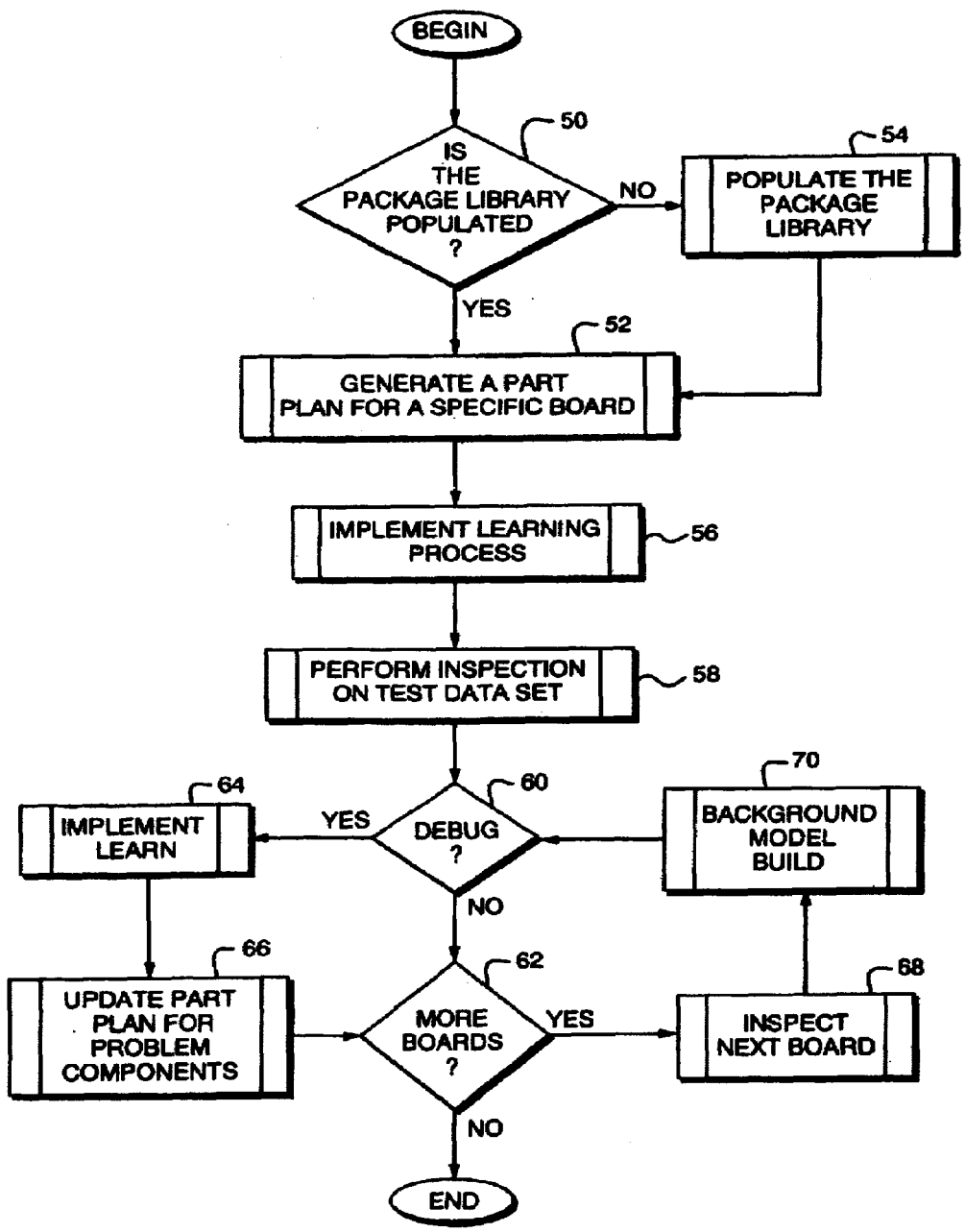
FIG. 2 illustrates the steps for inspecting a particular printed circuit board type.

Turning now to FIG. 2, the PCB inspection process is shown. In the inspection process, processing begins in step 50 where it is determined whether a package library is populated. If the package library is populated then processing flows to step 52 where an inspection plan is generated for a specific PCB. If the package library is not populated then processing flows first to step 54 where the package library is populated and then to step 52 where an inspection plan is generated for a specific PCB.

The package library is annotated to include a visual class type. In one particular PCB inspection application, eleven different visual class types are defined. It should be appreciated that some applications may require more than eleven visual classes and that other applications may require less than eleven visual classes. The particular number of visual classes used in any particular application will be selected in accordance with the needs of that application. Parts classified as a particular visual class have a common structure. For instance, all discretes with metal endcaps have two metal endcaps on either side of a colored body. Thus, a capacitor of size 60 by 30 mils (referred to as package type CC0603) and a resistor of size 120 by 60 mils (referred to as package type RC1206) have the same visual class even though they are of different sizes and perform different functions.

Libraries of parts typically describe the part as a specific package type with known dimensions and also a functional value. A part number is often given to a package type with a particular function value. In these libraries, it is not noted how the parts look or how they should be grouped via visual characteristics. An image processing system on the other hand e.g. image processing system 20 (FIG. 1), expects a grouping of parts based on their structure or appearance. Thus, it is useful to annotate any part libraries with a definition of visual classes.

It should be noted that if a library is already populated (i.e. if data on the objects to be inspected is already stored in the data base) or can be read from a computer database or other storage device, the population step may not be needed in which case processing begins by annotating the library. In practice, it is infrequent that the library will have no parts stored therein and a check is made to determine if there are entries in the library for every part on the board.

The package library includes information such as: (1) part dimensions; (2) part name; (3) assigned part number; (4) vendor; (5) body size; (6) does the part have leads?; (7) size of leads; (7A) type of leads (8) lead pitch; (9) does part have an orientation mark?; (10) where on the part should orientation mark occur. In one implementation the class types are one of eleven visual class types: (1) discretes with metal endcaps; (2) gull wing integrated circuits (ICs); (3) J-leaded ICs; (4) tantalum capacitors; (5) flat leaded (6) CAP; (7) discrete arrays; (8) MELF; (9) SOTs; (10) diodes; and (11) ball grid arrays (BGAs).

It should be appreciated that other visual class types can be added as need. Also, in some applications it may be desirable to include class types which are not visual class types of parts. For instance, it may be desirable to generate a set of visual classes around specific defects such as tombstoning or billboarding (part has one side touching the board and the other side is lifted up in the air), damaged part, and smeared paste. The package library is preferably provided as a database which can be accessed by various parts of the inspection system as needed. The part library population/annotation step is a non-board specific step.

It may also be desirable in some applications to put snapshots in the library. It is presently believed that the snapshot is board independent. However, a few tests have shown that a part on a light board will look brighter than a part on a dark board.

As shown in step 52, after populating the package library, the inspection plan is generated. The inspection plan is generated by taking in board specific information. Board specific information can be in the form of computer aided design (CAD) data, pick & place data, and/or PCB layout data (e.g. Gerber data). The inspection plan describes the location of each component on the PCB, describes the part type and what orientation it should have. The inspection plan also describes where the fiducials and vias are on the board. The inspection plan also describes the models to use to inspect each part. The inspection plan is initialized with default models for each component type.

Once the basic inspection plan is generated, processing proceeds to step 56 which corresponds to a board-specific learning step in which the information in the basic inspection plan is augmented. This board-specific learning process relates the known part information in the plan, such as geometric information, to its observed visual characteristics. This learning process is more fully described in conjunction with FIGS. 3, 3A, 4, 4A, and 14 below. Steps 50–56 above thus correspond to a set-up and learn procedure which takes place before an inspection step is performed.

After generation of the inspection plan and completion of the board-specific learning process, processing proceeds to step 58 in which an inspection step is performed. The inspection step is a board specific step and is described in detail in conjunction with FIGS. 5, 6 and 6A below. In step 58, the inspection is performed on a test data set. Generally, we should only expect to get three training boards when we first setup or train. The first is bare, the second is a pasted board and the third is a placed board. For each type of part on the board, we want to train the models to be able to detect when the part is present and when it is absent. Usually there is more than one instance of the part on the board. We can break up the instances into two groups, the learn and the test group. Each group should have labeled positive (part present) and negative (part absent) examples. The system will train the models on the learn group and verify they are working properly on the test set. (It is possible for the test and learn set to have elements in common.)

After completing the inspection of the test data set in step 58, processing proceeds to step 60 in which decision is made as to whether a debug mode should be initiated. The decision is substantially based upon the results of the inspection of the test data set 58. In particular, if the results of step 58 indicate that the models yield good results for all more components entire PCB, then decision is made in step 60 to proceed directly to step 62 where a determination is made as to whether any more boards should be inspected. If, on the other hand, the results of step 58 indicate that the models do not yield good results for one or more components or for an entire PCB, then decision is made in step 60 to proceed to step 64 where another learn step is implemented. This learn step will take the new false positives and false negative, along with other training data, and revise the models. In addition to retraining on the false positives and negatives, the user or the system may change the snapshot in the image model, change the dimensions of the part to better fit the data, add more models of a particular type, change the sequence of calling the models, and change the decision function for determining part presence or absence.

It should be noted that the user can set the system to debug mode at any time. It should also be noted that debug mode is mainly used to correct problems with any of the models in the inspection plan. If decision is made to enter a debug process then processing flows to the debug learning process of steps 64, 66. If a new model for a component has been learned in background mode, it can be substituted for one in the inspection plan. Otherwise, the learning steps for a particular model are repeated on a different set of images. Processing then flows to an update inspection plan step in which the model for a problem component is replaced with a new "debugged" model.

The decision as to whether the debug process steps should be followed can take place in either of two ways. In one approach, the inspection system itself identifies a problem inspecting a particular part (or stated differently, the inspection system itself identifies a problem with a particular model—e.g. the model yields poor results in inspecting a specific part). In this case, the inspection system itself as part of the debug learning process can ask the user a series of questions such as: (1) the part in question has a very different appearance than the other parts of this kind. Is this a normal variation?; and (2) the system is having difficulty inspecting this part. Is it damaged?

The debug and subsequent learning process results in a revised specific model or set of models for that part which the system identified as a problem part. After the new model or set of models is generated, the inspection plan for the problem component is updated.

In a second approach, the system does not recognize that it has a problem correctly inspecting a part (i.e. the system does not realize that a model it is using is resulting in incorrect inspection results). For example the system does not recognize that it is providing false positives (i.e. labeling a bad part as a good part, or labeling an empty location as having a part) and false negative (i.e. labeling a good part as a bad part, or incorrectly labeling the part absent). In this case, external intervention is required (e.g. a user or something else external to the system must recognize that the system has a problem identifying a part). Once the problem is identified, the system is notified and instructed to change the model to reduce the number of false positives and false negatives. In response to the manual instruction and in order to reduce the number of false positives and false negatives, the system executes the debug mode process, learn, and inspection plan update. During the debug and subsequent learn process, the user, for example, can provide the images to the system which resulted in the false positives and false negative results.

It should be noted that the debug process can be implemented at any time (e.g. after inspection of a single component or board or after inspection of one-hundred components or boards).

Processing then proceeds to a decision step where decision is made as to whether more boards remain to be processed.

Upon completion of the learn step 64, the inspection plan is updated for the problem component or PCB. That is, the new model generated in the learn step 64 is associated with the part or PCB which resulted in the poor inspection results. Thus, the next time that particular part is inspected, the new model or models are used in the inspection process. It should be noted that all inspection plans are board specific.

Processing then again proceeds to step 62 where decision is made to inspect more PCBs. If more PCBs remain for processing, then processing proceeds to step 68 where the next board is inspected.

After the next board is inspected, processing proceeds to step 70 where an optional background model build process step takes place. Thus, during regular inspection, a background model learning step can be performed.

The steps for performing a background model learn are the same as the steps for the learn. Background model learning can process data over many boards and thus includes an amount of data which is relatively large compared with the amount of data used in the initial learn process of step 56.

As mentioned above, if a decision is made not to debug, then processing directly proceeds to the decision step where decision is made as to whether more boards remain to be processed.

Thus, if in step 62 decision is made that no more boards remain to be processed, then processing ends. If on the other hand, more boards remain to be processed, then a loop is entered in which the next board to be inspected is identified and inspected and the optional steps of background model builds and debugging are repeated. It should be appreciated that in some embodiments it may be preferable to not always perform background model learning or debugging. It should be noted that the part plan can be saved and used later if the board associated with the plan is built again.

FIGS. 3, 3A, 4, and 4A describe elements of a learning process. The models may need to be trained on board specific images. For one part type, the models need to see examples of (1) a tightly cropped image of the part without any surround rotated to the correct orientation, (2) the part, on paste, with its surround (known as the "place" image), (3) examples of pasted pads and the surround without the part (known as the "paste" image), (4) examples of bare pads and the surround without the part (known as the "bare" image). Therefore, in one particular embodiment, the minimum number of example images that are required to train the models for a part is four. In some applications, however, the minimum number of examples can be less than four. For example, in some applications, (e.g. some printed circuit board inspection applications, the bare board has been found to be unimportant. Preferably images (2)–(4) above are from the same reference designator (i.e. from the same part at the same location on a PCB) and image (1) is from a different reference designator (i.e. from the same part at a different location on the PCB than examples (2)–(4)). Image (1) may also be captured independently by a non-board specific technique (e.g. it can be imaged alone without a board).

In learning how to inspect a part, there exist several variabilities that occur. These include part color/luminance variability, part size changes, non-uniform illumination, less or more oxidized metal, different types of paste, and a variety of bare board features. The bare board features include different colors on the same board, a variety of thicknesses and finishes, vias, traces, and silkscreen. By constraining the bare, paste and place images to come from the same reference designator, we at least can eliminate the board variabilities during the learn. It is important that the snapshot come from a different reference designator or even a different board because of how the image model performs a match. The image model checks to see if there is a part exactly like the saved snapshot in the region of interest. If the snapshot came from the same reference designator as the place image, the snapshot would match the part perfectly (with a difference of 0). Parts actually vary quite a bit in appearance from instance to instance. We would like to try to quantify that variability in the learn process. A snapshot matched to itself does not tell the system anything about the amount of part appearance variations.

It is desirable to have the system be able to automatically crop the snapshots from an example when needed. The alternative is to have the user import an image of the board containing the part or an image of the part on a background, rubber band the part, copy and paste the part to a new image, rotate the cropped image to the appropriate orientation and save it. This user intervention gets quite cumbersome when there are many part types.

Figure 3:
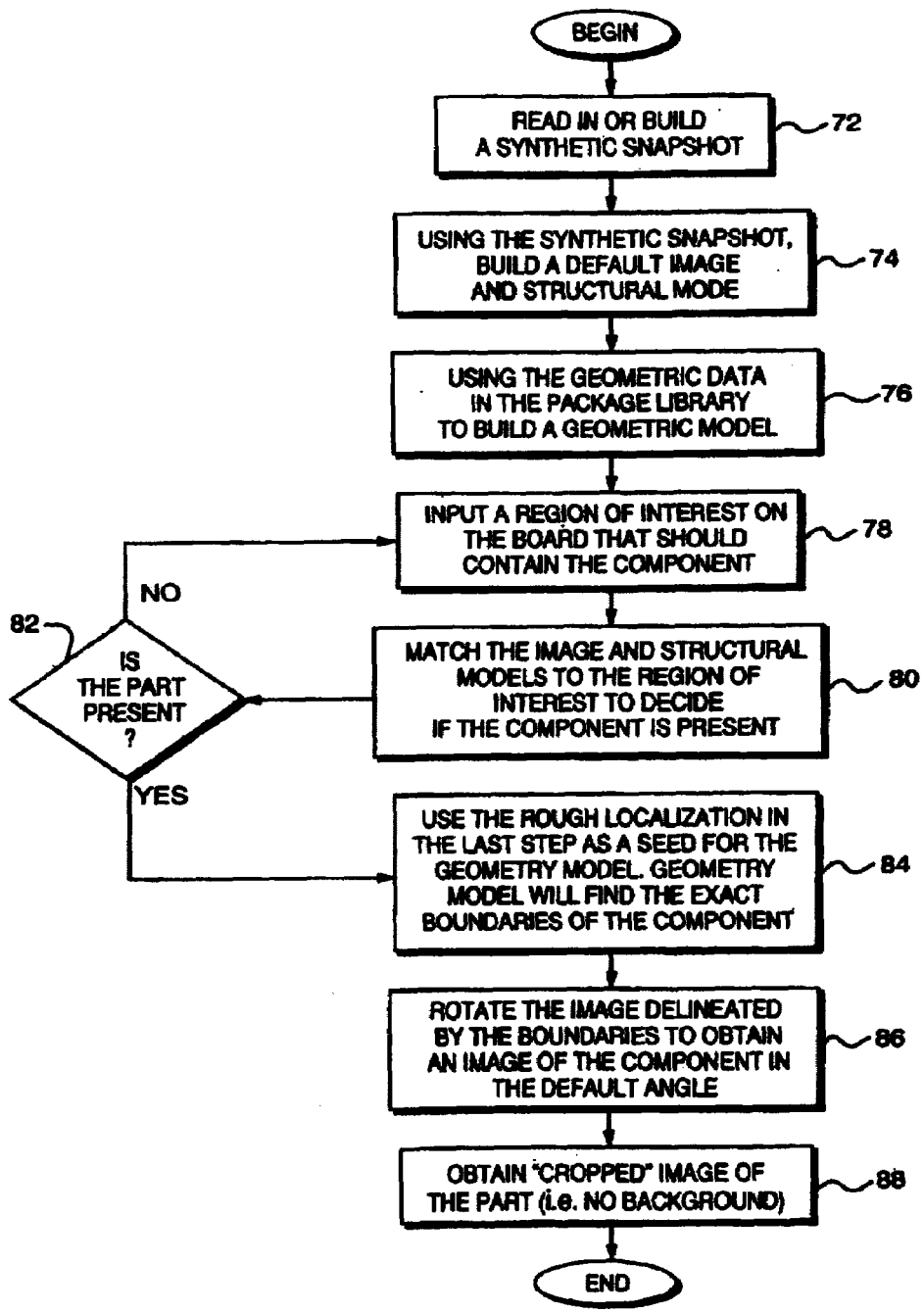
FIG. 3 illustrates the steps of automatically obtaining a snapshot of a component rotated to be at the default orientation.

In FIG. 3, a process for automatically obtaining a snapshot of a component rotated to be at the default orientation are shown and thus the method described in FIG. 3 describes how to automatically obtain a cropped image of a part.

Referring now to FIG. 3, processing begins with step 72 in which a "default snapshot" of an object to be inspected is obtained. The best way to get a real snapshot of a part is to use the inspection process previously defined to localize the desired part in a region of interest. If the part is well localized, the image of the part can be easily rotated to the default orientation and cropped. Currently, both the image model and the structural model require a snapshot in order to inspect. In order to break the circular nature of the problem, we can bootstrap the system with a synthetic snapshot that has the same geometry of the desired component and some of the key visual characteristics of the part. Also, a snapshot of a similar looking part may also be used. For instance, if we need a snapshot of a CC0805 of part number 123-000-000, we may use a previously captured snapshot which shares the same package type, CC0805, but is of part number 123-000-001. These default snapshots may be stored in database 12 or in the inspection plan itself.

Regardless of how the default snapshot is provided, processing the proceeds to step 74 where the snapshot is used to build a default image model and a default structural model. The image and structural models generated in step 74 are referred to as "default" models since the models do not yet any board specific information.

Processing then proceeds to step 76 where the geometry model is generated or built purely geometric information alone (e.g. the geometric information available in the package library). One can thus build a geometry model directly from the information about the part in the package library.

Next, as shown in step 78, a region of interest (ROI) on the PCB to be inspected is identified. The ROI should contain the object under consideration (e.g. the part such as the circuit component to be inspected). In processing step 80, the default image and default structural models are applied to the ROI to decide if the part is present within the ROI. Processing then proceeds to step 82 where a determination is made as to whether the part is present in the ROI. Thus, the image and structural models are used to determine whether the part is present in the ROI.

If in decision block 82, decision is made that the part is not present, then processing proceeds back to step 78 where a new ROI is input for application of the image and structural models in step 80. This loop is repeated until the image and structural models indicate that the part is present in some ROI or until all of the ROIs have been explored and the part is deemed not present.

If in decision block 82, decision is made that the part is present, then processing proceeds to step 84. In step 84, the structural model provides the roughly localized part position on the PCB in the ROI to the geometry model. The output from the structural model includes the center of the part in the ROI <dx, dy> (delta position from expected location) and a rough estimate of how the part is rotated. The structural model may go a step further convert <dx, dy> and theta to the positions of each edge of the part that is considered geometry model.

The geometric model localizes (i.e. finds) the boundaries and any rotation angle (θ) of the part to an accuracy of a sub-pixel order of magnitude (e.g. with a few tenths of a pixel).

As shown in step 86, once the exact boundaries of the part and its rotation are known, it can be rotated to the default orientation. The part is rotated by an amount equal to the minus of the rotation angle (−θ) to obtain a "nominal angle" which is defined in the part library (i.e. the part library holds a definition of what zero degrees rotation is and this can be related to what is found on a particular printed circuit board.) For instance, if the system find the part to be rotated by 1 degrees counter clockwise and the default orientation of the part is at 90 degrees clockwise, the system can rotate the part image by 91 degrees clockwise to transform the image into the correct orientation.

Once the snapshot has been found and cropped as shown in step 88, a reference designator may be chosen at random to provide the placed, paste, and bare examples.

Figure 3A:
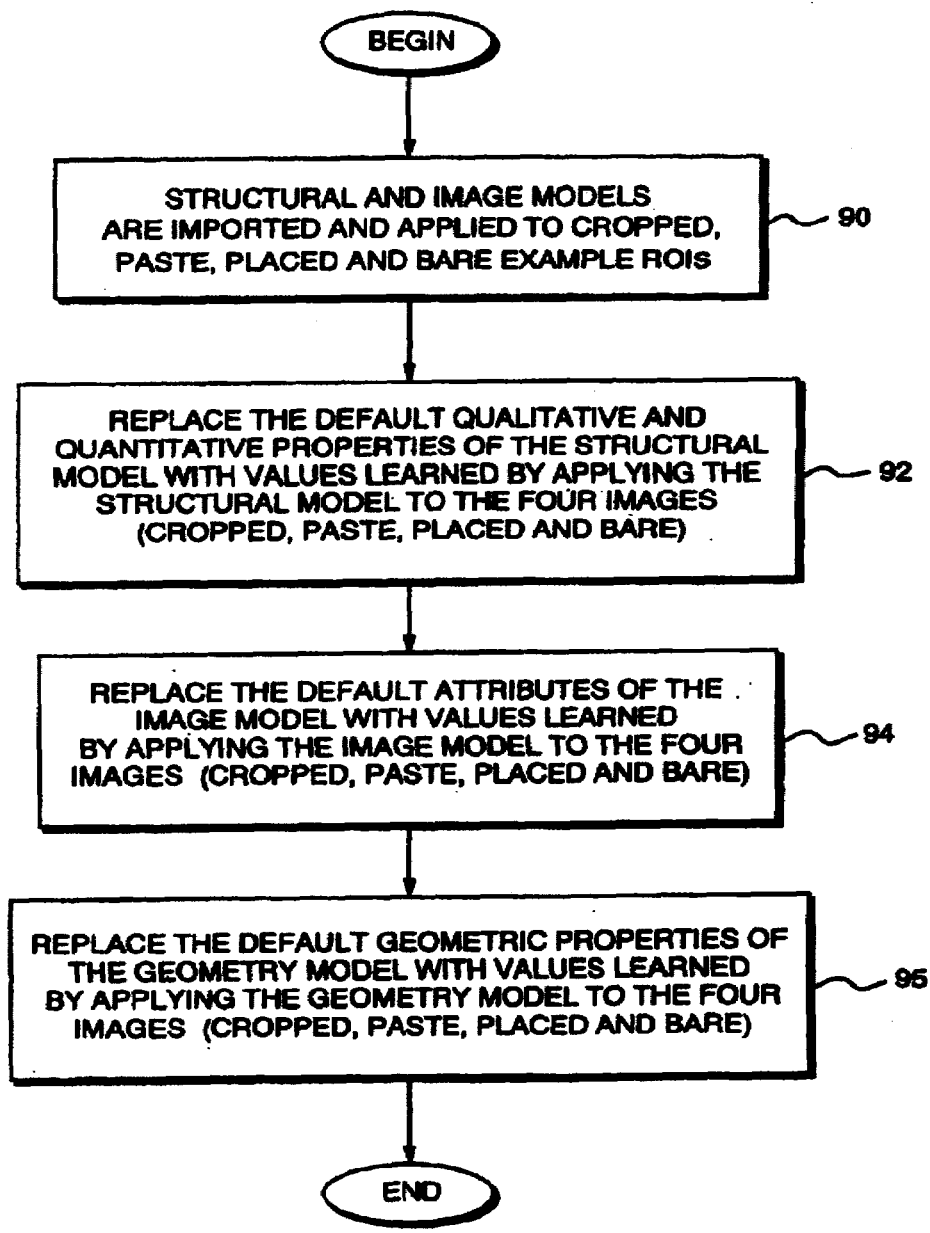
FIG. 3A describes a learning process, given a set of example images (bare, paste, place, and a part snapshot)

FIG. 3A discusses one way to train the models on the snapshot and board specific examples. This corresponds to step 56 in FIG. 2.

Referring now to FIG. 3A describes the learn process for the image in the structural model. Processing begins in step 90 in which the structural and image models are imported and applied to cropped, paste, placed and bare example ROIs. It should be noted that in the process flow of FIG. 3A, the images are randomly selected. In some applications, however, it may be desirable to select the best set of example images to be used in the learn process. Such a technique will be described below in conjunction with FIGS. 4 and 4A.

Processing then proceeds to step 92 in which the default qualitative and quantitative properties or attributes of the structural model are replaced with values learned by applying the structural model to the images. In one embodiment, four images—i.e. the cropped, paste, placed and bare images are used. It is recognized, however, that the invention need not be limited to the four images since this is a very generic learn flow. The attributes of the structural model may be modified at several levels. At a top level, the structural model may just record how well or poorly it performed on the paste and place images. The performance can be stored as a set of scores with at least one score for the paste image and one score for the place image.

The structural model may be modified at a lower level. We may instruct the structural model to change its quantitative and qualitative relationships to best fit the placed image and to best distinguish itself from the paste image.

Processing then proceeds to step 94 in which the default attributes of the image model are replaced with values learned by applying the image model to the four images (the cropped, paste, placed and bare images).

Similar to the structural model, the image model may be modified at several different levels. First, the snapshot is associated with the model. Second, The image model scores on the paste and place images may be stored. In addition, other attributes within the image model may be modified to best fit the placed image and to best distinguish itself from the placed image. For instance, it may learn that in the paste image at locations (x1, y1) and (x2,y2) the image model provides a good match. This means that there are features on the bare board that look very much like the part. We can generate a score function such that the image model when applied to a new region gives a low confidence match score if it finds the best fit at (x1, y1) or (x2,y2).

Processing then proceeds to step 95 in which the default attributes of the geometry model are replaced with values learned by applying the geometry model to the four images. For instance, the geometry model can measure the true dimensions of the part and its subparts from the placed image and the snapshot. The dimensions stored in the default geometry model are the mean of the expected dimensions for that part type across all vendors. The geometry model may also learn the strength of the gradients at the part and board boundaries and also between subpart boundaries. The geometry model may also learn the best color channel, if the image is provided in color, to compute the gradients.

Processing then ends.

It is appreciated that choosing a random set of bare, paste, place images to train on (as described in FIG. 3A) may not be the optimal procedure. Ideally, the system should look at all reference designators across the different types of boards (e.g. bare, paste and place) to choose the example images that provide the best performance.

Figure 4:
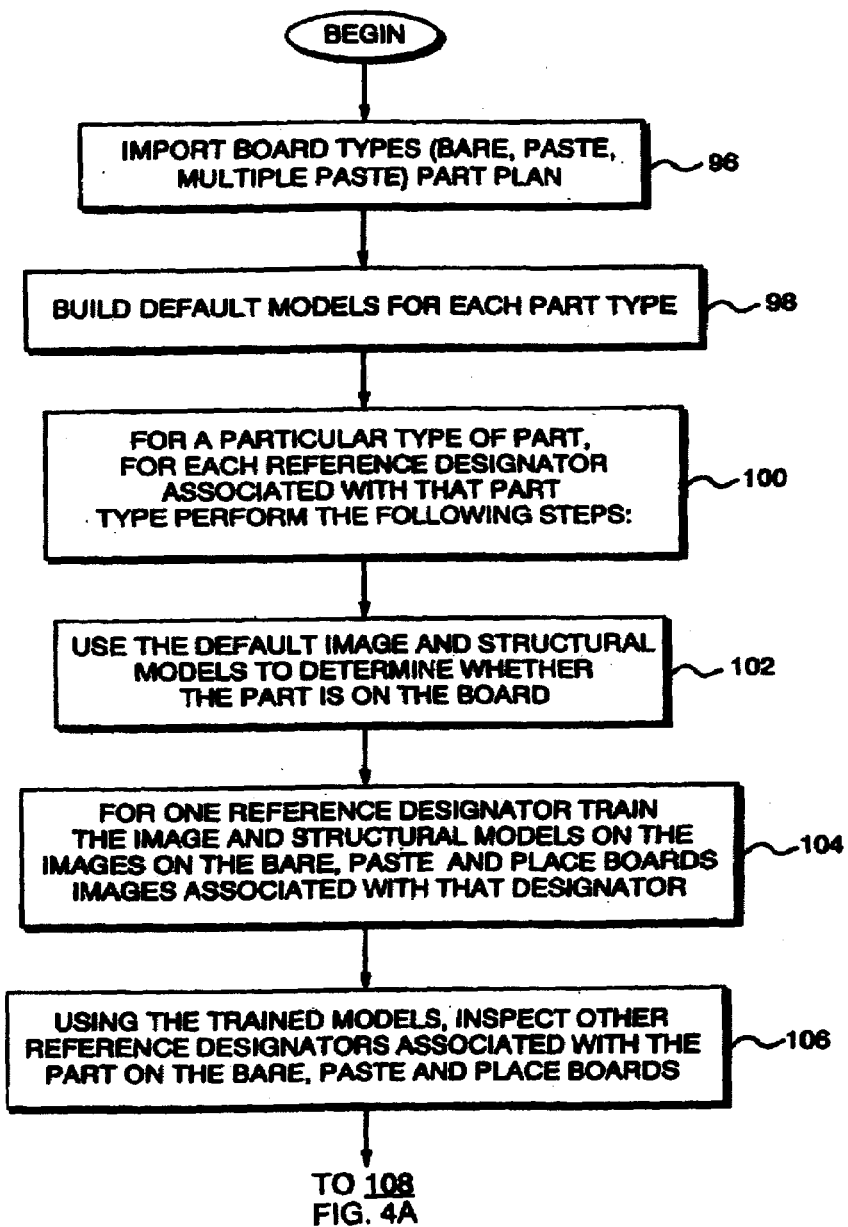
FIGS. 4 and 4A illustrate a learning process to pick the best set of example images to be used in FIG. 3A.
Figure 4A:
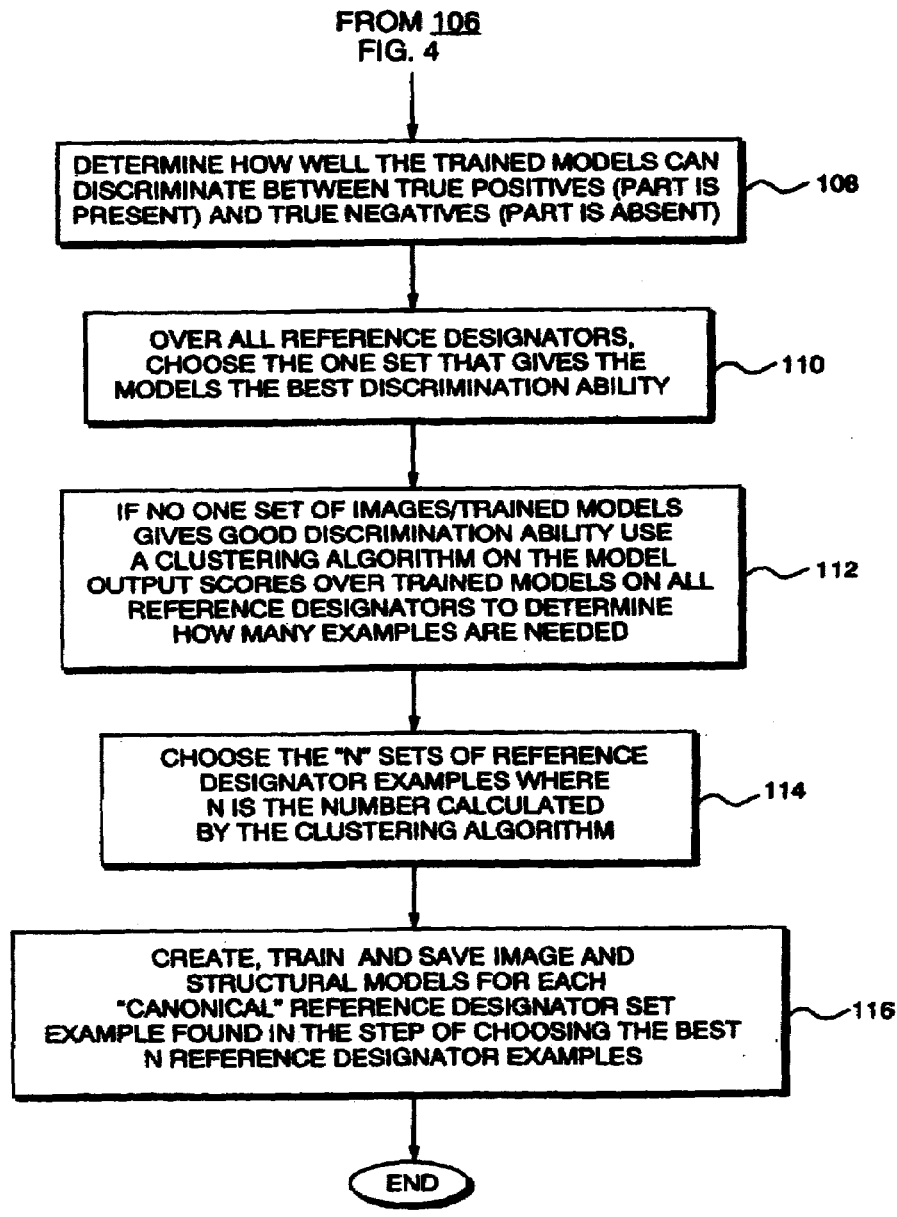

Thus, referring now to FIGS. 4 and 4A the steps which could be performed if it were desired to select the best cropped, paste, placed and bare images to use in the learn process described above in conjunction with FIG. 3A are shown.

Processing begins in step 96 by importing: (1) the board types (bare, paste, place), (2) the inspection plan. The example place boards are commonly referred to as "bronze boards" because there may have been errors or omissions in the placement of the parts on the boards.

In processing step 98 default models associated with each part type are generated and in step 100, for a particular part type, the default models are trained on one more reference designators and applied to every other reference designator that is associated with the part type. It should be noted that each location (or board position) on a printed circuit board at which a component is to be placed is assigned a unique reference designator. Thus, in the inspection plan each reference designator specifies a particular, unique location on the printed circuit board as well as a particular part which is to be located that board position.

In step 102, for a particular reference designator, the default image and structural models of a particular part type are used to first check if the part is present in the "bronze" board and absent in the paste and place boards at that reference designator Processing then proceeds to step 104 in which once the set of assertions from step 102 are verified, the models are trained on the three images derived from the example reference designator (Note that it is not require to train on all three image. In some embodiments the bare board is not found to be useful). As shown in step 106, the learned models can then be used to inspect the rest of reference designators associated with the part type both on the "bronze" place board and on the paste and bare boards.

As shown in step 108, the models trained on a particular reference designator can be rated in terms of how well they separate the true positive examples, "the part is present", from the true negative examples, "the part is absent". For each reference designator used as a training example, one can rate how effective it is at providing this separation. As shown in step 110, the example set of images which provides the best separation should be chosen as the training example to be used in full production board inspection.

As shown in step 112, it may be found that one set of training images is not sufficient for the models of one part type to separate the true positives and the true negatives. For instance, for one part type, there may be both brown and white instances on the board. Rather than having to choose between a brown or a white example, we can train two sets of models, one on a brown part and one on a white part. A simple clustering algorithm on the outputs of the image and structural models scores can be used to determine if more than one reference designator is required. The clustering algorithm will determine how many reference designator examples are required.

In step 114, for each cluster a reference designator set of images is chosen. Default image and structural models are generated for each cluster. A learn is then performed for each set of <models, reference designator>.

Processing then proceeds to step 116 where the learned models are then saved back into the inspection plan. Processing then ends.

It should be understood that FIGS. 4 and 4A, describe a scenario in which only a single trio of images (one example of a bare, paste and placed image) are used for training. The other N−1 images are used for testing to determine or gauge how well the models work. It should be appreciated, however, that in some applications more than one reference designator could be used for training in step 104 and therefore it would be desirable to select the best set or sets of reference designators which give the models the best discrimination ability over the test set (i.e. whatever is left).

For example, if two reference designators are available, one can be used to provide a snapshot and one can be used to train the models in the paste and placed images. As another example, given three reference designators a first reference designator could be used for the snapshot and the remaining two references design would be used for the training. This can be extended to the case where N reference designators are available and M (where M is less than N) are used for training leaving N−M reference designators available for the testing. Lastly, it should be noted that this process can be used to choose the best snapshot as well as the best training set of ROIs It should be appreciated that in the description provided above, no distinction is made between selecting the snapshot from selecting the paste, place, and bare training images. In the worst case, every reference designator should be examined as a candidate for the snapshot. In practice, however, this is too time consuming.

Figure 5:
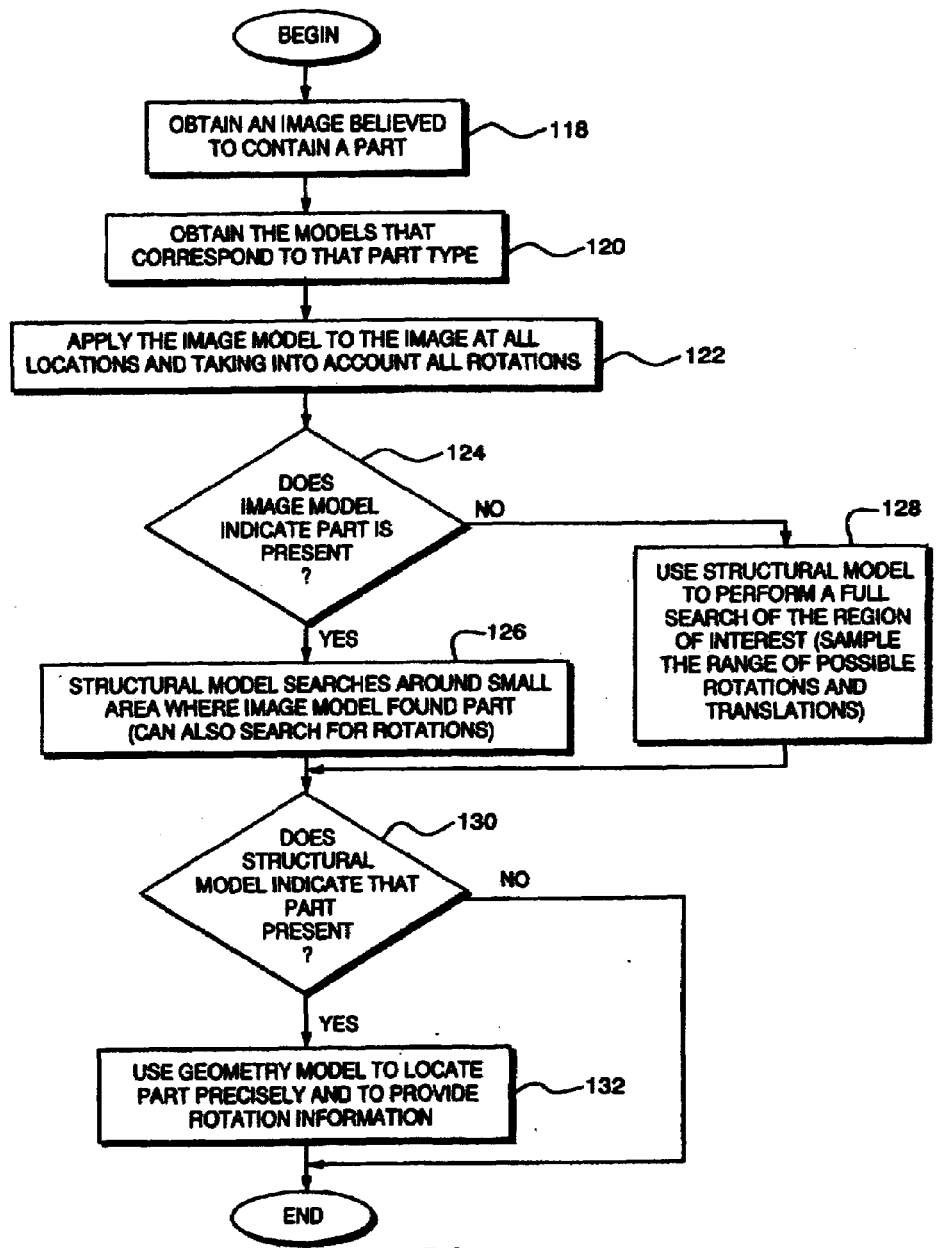
FIG. 5 illustrates the steps of an inspection process for a component.

Once the models for each part type are generated and are trained on a set of example images, the system is ready to inspect boards. FIG. 5 illustrates the steps of an inspection process which utilizes multiple models.

Referring now to FIG. 5, processing begins in step 118 by first obtaining an image of a region of interest on the board that should contain a specific part type. Processing then proceeds to step 120 models associated with that part type are obtained.

Next, as shown in step 122, the image model is applied to the captured image. With any model it is desirable that we apply the model to all possible center locations at all possible rotations to determine the part center and rotation. This is known as an exhaustive search approach and ensures that if there is a part in the that looks similar to the snapshot in the image model, the image model will find it. For speed issues the image model can sample the set of centers and possible rotations when searching the ROI. The greater the sampling the quicker the operation. However, as sample size increases, the probability of the model finding the part decreases. To try to maximize both speed and effectiveness, we apply a coarse to fine strategy; first sampling coarsely and then sampling finely around the regions that are the best candidates for the real part center and rotation. This strategy can be used by any model, not just the image model.

Processing then proceeds to decision block 124, a decision is made as to whether the image model indicates that a part is present.

If decision is made that the image model believes a part is present, then processing proceeds to step 126 where the structural model is used to search around a relatively small area where the image model found the part. If decision is made that it is not known if the part is present, then processing proceeds to step 128 where the structural model is used to perform a full search of the ROI. When the structural model searches the whole ROI, it may employ the coarse to fine searching method Next, in step 130, based upon the results of the structural model, a final decision is made as to whether a part is present. (Note in deciding whether the part is present, the structural model may use the image model score as part of its decision function) If the part is deemed not present, then processing ends.

If, on the other hand the part is deemed present, then processing continues to step 132 in which the geometry model is used to locate the part precisely and also to provide more detailed rotation information about the part. Processing then ends.

Figure 6:
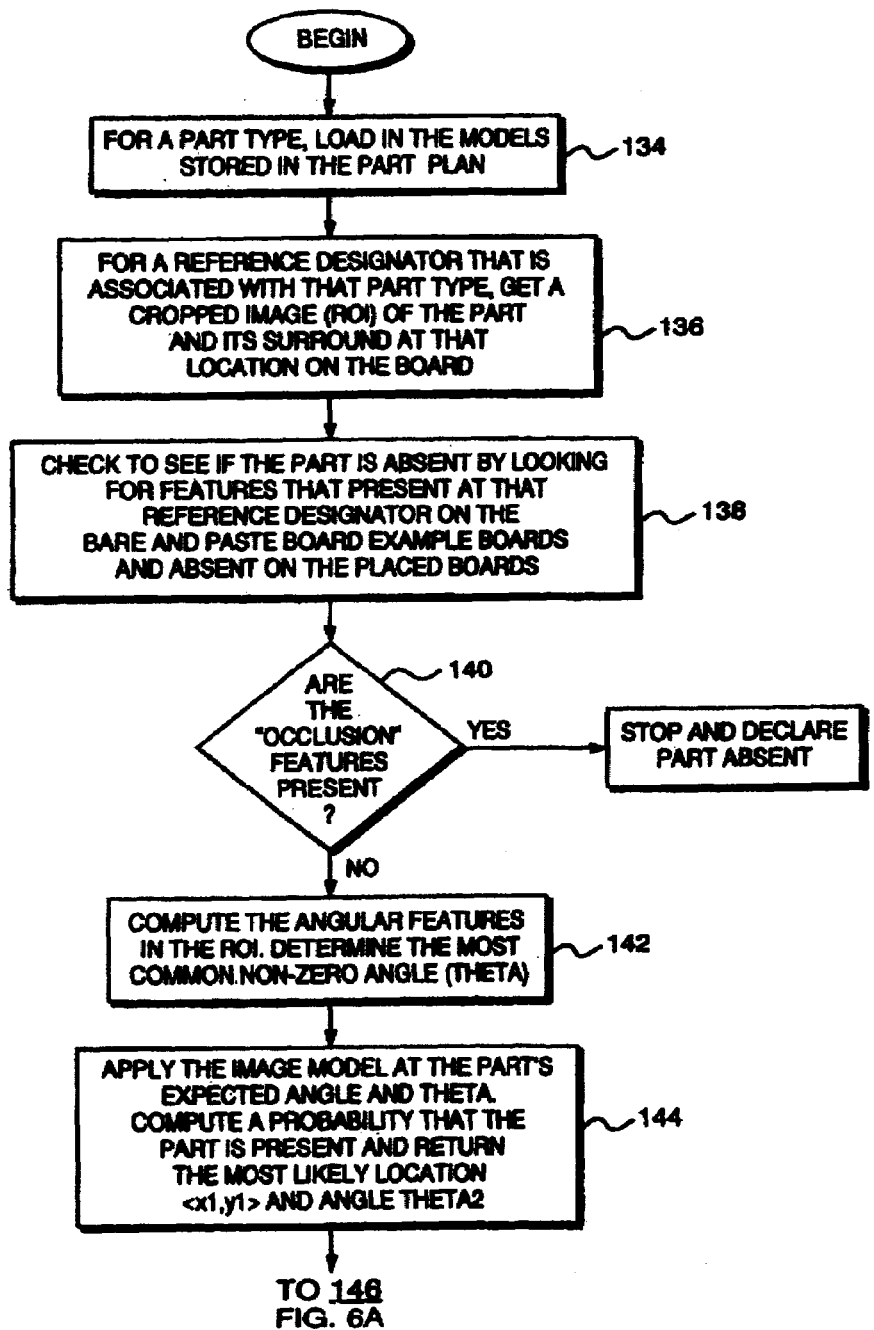
FIGS. 6 and 6A illustrates a specific implementation of the FIG. 5 to inspect a component.
Figure 6A:
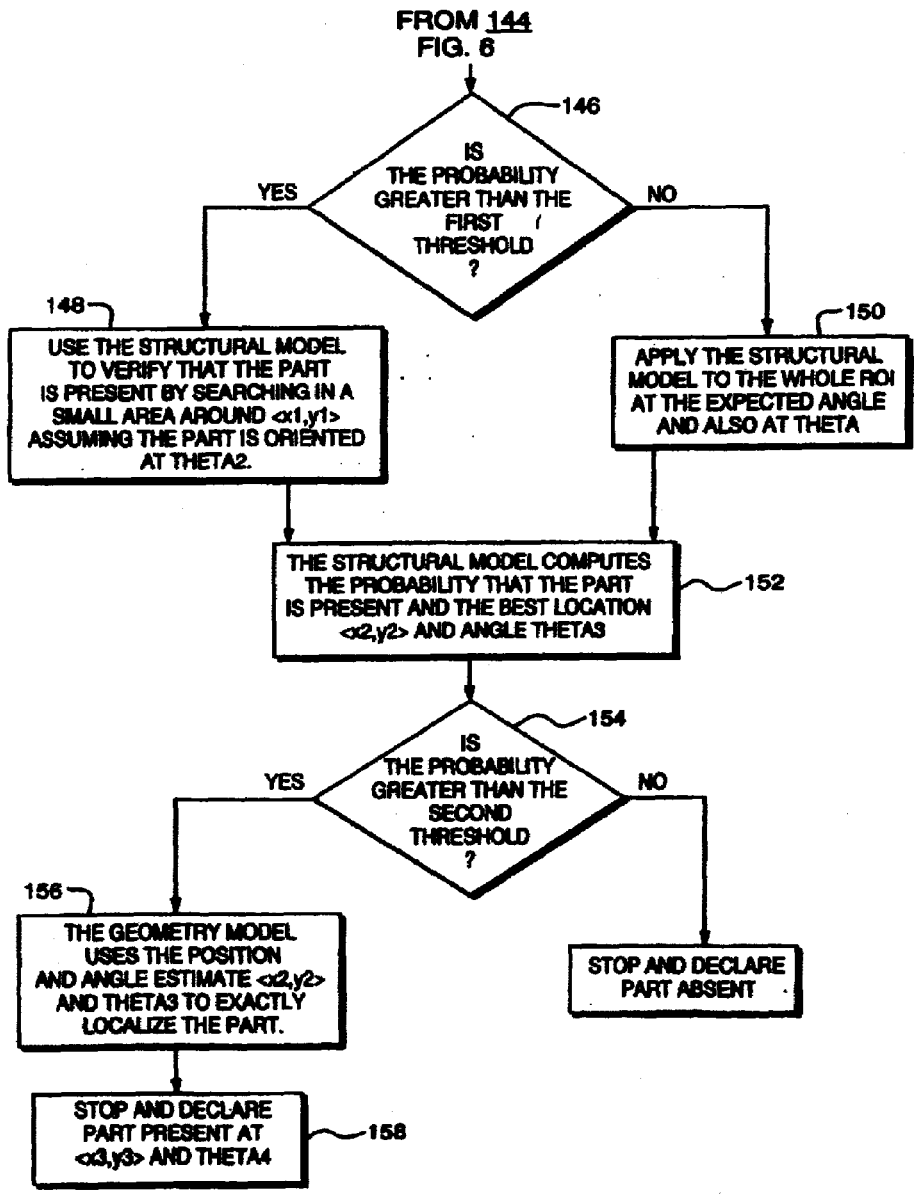

FIGS. 6 and 6A illustrate in more detail the steps of an inspection process for a particular component at a particular reference designator. Steps other than the application of the three models are identified. Decision procedures to determine if the image and structural model indicate the part is present are also described.

In step 134, for a part type, the models are loaded into the inspection plan. Next as shown in step 136, the system acquires a picture of the part and its surround for a particular reference designator. This image is labeled the "region of interest" or ROI. The ROI may be cropped from a larger picture of the board that has already been acquired or pieced together from several camera frames Determining the size of ROI is dependent upon the part type, its size, the position tolerances inputted by the user, and the size of any the surround regions in the models.

A first optional step 138 is to inspect the ROI for features that appear on the bare and pasted board, but should be occluded when the part is present. These features include vias, traces, and pads (pasted or bare) that are commonly hidden under large parts such as integrated circuits or parts with hidden connections such as ball grid arrays. One implementation of this step is to look for circular, rectangular or linear features of an expected size. Another implementation is to compare current ROI to the same ROI on the learned paste board. If decision is made in step 140 that the occlusion features are present with high confidence, then processing ends since this means that the part is absent.

If decision is made in step 140 that the occlusion features are not present, it is assumed that something (e.g. the correct part or something else), is in the image. The system then performs a second optional step 142 to process the ROI to look for dominant angular features. One method to do this is to compute the gradient direction and magnitude at each point in the image. Based on the angular features, the system computes the dominant angle of the objects in the image. If the part is not present, the background of the board traces and pads will produce dominant angles of 0, 90, 180 or 360 degrees. This is because these features are usually aligned or orthogonal to the camera frame. If the part is present, its features will contribute to the set of dominant angles. The best dominant angle, theta, other than 0, 90, 180, or 360 is recorded for later use. This gives the system an estimate of how the part is rotated, but not where the part is located.

Next as shown in step 144, the image model is applied to the ROI image. The image model essentially looks to see if the ROI contains a pattern that looks very similar to the cropped snapshot and very different from the bare or paste images. It uses the learned data to compute a probability or a confidence that the correct part is present. The image model searches over the entire ROI. The image model should match the snapshot at multiple rotations at multiple locations in the image in case the part itself is translated from the expected position and is rotated beyond the expected rotation. To increase speed, the image model may not check for the part at every location in the ROI. Part size and type of part currently determines how coarsely the image model samples the image space. In addition, to increase speed, the image model only checks for two rotations, the expected rotation and theta. After a coarse search, the image model may do a fine search around the best candidate for the part center. The image model outputs the best location, <x1,y1> and angle hypothesis, theta2, for the part in the ROI. It also outputs a probability, phi, that the part is present.

Next, in step 146, a decision is made as to whether the image model indicates that a part is present. This is based upon a first threshold value, here denoted phi. It should be appreciated that although a relatively simple threshold value is here used, in some applications it may be advantageous or desirable to utilize a relatively complex function to provide the threshold. For instance, a more complex function could take the computed probability phi, the actual match score between the image snapshot and the candidate location for the part, the candidate location, and the probability that the image is not paste to determine whether the part is really present.

If the image model is confident that the part is present and looks exactly like what it has learned, then processing flows to step 148 and the structural model is used to verify that the part is present. It tries to increase the localization resolution by searching around a relatively small area where the image model found the part. In this case, it only checks for the part, in small step sizes such as 1 or 2 pixels, around location <x1, y1> and angle theta2.

If the image model is not confident that a part is present, then processing flows to step 150 in which the structural model dues a full search of the ROI. Again for speed, the structural model does not check for the part at every location and rotation in the ROI. Part size currently determines how the coarsely structural model samples the ROI. In addition, for further speed increase, the structural model only checks for two possible part rotations, the expected rotation and theta.

The structural model ultimately decides if the part is present. If, in either case, it determines the part is in the ROI, it returns the best location, <x2,y2> and angle, theta3 a shown in step 152. This information is sent to the geometry model, which then localizes the part to subpixel accuracy and refines the theta estimate as shown in step 156. The geometry model returns the label "present", the final center position, <x3,y3>, and angle, theta4 as shown in step 158.

If the structural model determines that the part is not present, the system stops and returns the label "absent".

The flow described in FIGS. 6 and 6A is optimized for speed. The optional precursor steps of comparing bare board features and calculating a theta estimation can be skipped. In the most thorough mode, the image and structural models can search every possible position for the part in the ROI. They can also perform the search looking for the part at a variety of angles. In addition they may do a search for both position and rotation in a coarse to fine manner.

It is possible via the learn and debug that an alternate image or structural model has been specified. If this is the case, at the appropriate time, both would be applied. If either matched, the process would continue as specified in FIGS. 4 and 4A.

It should be noted that the decision functions in FIGS. 6 and 6A can be base on other factor or expressions more complicated than "is the probability > phi". This is just an example. Also, a mixed combination of model scores may be used in the decision function, such as in the structural model decision function.

It should also be noted that although FIGS. 6 and 6A only show outputs of "present" and "absent". There is an intermediate scenario, where something is in the image, however, it is not the correct part. In this case, at the structural model stage, using the second decision function, if the probability is medium that the part is present, the system could branch to another analysis procedure which performs a diagnosis and comes out with a result of "part damaged", "wrong part", "smudged paste", "part tombstoned" . . .

Finally, this work is aimed at printed circuit board inspection, but the strategy is applicable across image processing domains. One could use the same strategy for face recognition, person recognition, and image database search for instance.

Figure 7:
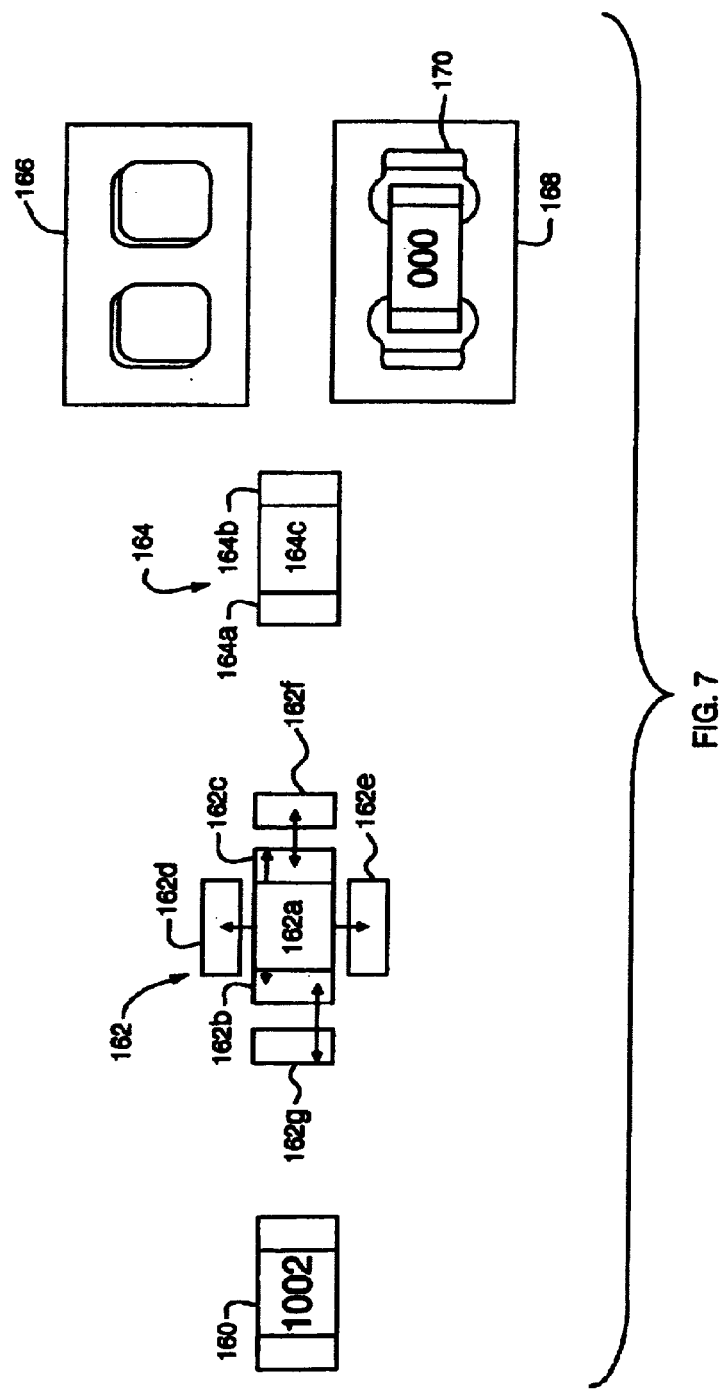

Referring now to FIGS. 7 and 7A, an image model 160, a structural model 162, and a geometry model 164 shown in nominal orientations are trained on captured image regions 166, 168. The image regions 166, 168 correspond to portions of a PCB. The image region 166 is a so-called "paste" image meaning that the PCB has paste (e.g. solder paste) disposed in areas in which a circuit component will be mounted. Thus, no circuit component is shown in image 166. The image region 168 is a so-called "placed" image meaning that a circuit component 170 should be found in a particular location within the region 168.

Each of the three types of models are provided for a predetermined visual class. Eleven class types used in one printed circuit board inspection embodiment are listed above in conjunction with FIG. 2. As noted above, fewer or greater than eleven class types can be used and the particular number of class types as well as the class types themselves will be selected in accordance with the needs of a particular application.

To determine the number of visual classes, we considered all the typical component types for surface mount printed circuit boards. We essentially clustered the components based common visual characteristics of the parts. Our goal was to generate the smallest number of visual classes that spanned all the types of typical parts. In the case of PCB components, we discovered the component lead type dictated the visual appearance of the components. For instance, components with endcaps are generally resisters and capacitors, all which have two metal endcaps and a colored body. Components with gull wing leads are usually integrated circuits that usually have a black rectangular body with metal leads that protrude from the body, bend down in the z axis, and then straighten out. In each case, even though the size of the whole package and its subparts can change, the overall configuration of the component stays the same. This is why the structural model is well-suited to represent these classes.

This technique of clustering visual stimuli into visual classes is not unique to the printed circuit board inspection application. It is applied to most computer vision applications in order to generate a set of models that cover the class of visual stimuli for that application. One example is in the area of face detection. Faces under different illumination conditions, with different expressions, of people with different genders and ages can be clustered into groups based on visual similarity. For instance, in prior art work related to image processing of faces, it was found that frontal faces could be clustered into six visual classes. Although the visual classes had no name or semantic meaning to humans, the clusters greatly aided the problem if face detection. If a new image, when processed, fell into one of the visual clusters, it was identified as a face. If it fell outside the clusters, it was identified as a non-face. A measure of confidence in the diagnosis, was how close the new image was to a face cluster.

Visual class clustering is common in other applications such as medical imaging (e.g. characterizing and clustering the appearance of tumors through a sensor), military applications (e.g. classifying patterns for detecting objects from synthetic aperture radar), and even applications such as traffic flow monitoring (e.g. classifying different patterns of traffic flow).

In this particular example, the models 160–164 each belong to the visual class type called DISCRETES. Each of the eleven visual class types includes nine elements to the overall matching method (1) occlusion features; (2) theta estimator regions; (3) image model properties; (4) structural model properties; (5) geometry model properties; (6) orientation mark types; (7) alternate models; (8) learn parameters (9) the decision function.

The occlusion attribute identifies occlusion features expected to be present in the ROI. The theta estimator attribute identifies the region(s) over which the theta estimator should be used. The structural model attribute describes the regions, region properties and relations from which the model is comprised. The geometry model attribute describes the composition of high gradient or edge attributes. The orientation mark identifies the type of mark expected to be present on the part body.

The alternate models attribute identifies alternate models which can be used for each part in the particular class type. For instance, an alternate model might include an image model of the part when it is place upside-down. The learn properties include information concerning which characteristics should be learned and saved for each model in each class type. Finally the last property describes the decision function for whether the part is present or absent. This decision function may take as input the outputs of one or more model types.

An example of the visual class information for the visual class of discretes used in a printed circuit board application is shown in Table 1 below.

TABLE 1

Visual Class: DISCRETES

| Occlusion | Theta Estimator | Image Model | Struct. Model | Geom. Model | Orientation Mark | Alt. Models | Learn Notes | Notes |
|---|---|---|---|---|---|---|---|---|
| pasted pads | Use over the whole ROI or the Error bounding Rectangle | Use Full Image with potential emphasis on endcaps | 3 Body Regions 2 Paste Regions 2 Background Regions | Multiline Order of operations: 1)theta 2)Dx Dy 3)Theta revision Fit external boarders of endcaps first Use body boarders to verify result Change dimensions from original specs. To do a best fit of part. | In most cases no orientation mark In a few cases orientation mark is a stripe | Could have models for flipped parts | Geom. Model will tell true overall size and endcaps. Save all structural All model params. Incl: - determine ratio between endcap and paste. - Body and background | Structural Model is the decision maker on presence/ absence |

The image model 160 corresponds to a cropped image which can be provided, for example, in accordance with the techniques described above. The structural model 162 here corresponds to a structural model for a predetermined component in the visual class DISCRETES. Thus the structural model includes a first portion 162a which represents a main body of the discrete part, proximate end portions 162b, 162c which represent "end caps," (i.e. the leads of a discrete component) side portions 162d, 162e which represent board background portions and distal end portions 162f, 162g which represent pad paste regions. The geometric model 164 includes endcap regions 164a, 164b and body region 164c.

In one embodiment, the system trains at two different rotations. Thus, FIG. 7A shows a second orientation of image structural and geometric models 160', 162', 164'. The models 160', 162', 164' are substantially the same as the models 160, 162, 164 but are simply rotated at an angle which is different than the angle of the models 160, 162, 164.

In FIG. 7, the models 160–164 and regions 166, 168 are shown at rotations corresponding to 0° and 180°. As indicated in the figure, the structural model portions are rotated to match circuit components having that general orientation. In FIG. 7A, the image, structural, and geometry models as well as the regions 160'–170' are shown at nominal ±90°. FIG. 7A again shows a paste and placed portions of a PCB. The models are intended to match and identify in a real-time process portions of the PCB being inspected within the regions 166, 166' 168 168'. The above description views these as instances of ROIs of true positives and true negatives at the two/four different orientations.

Figure 8:
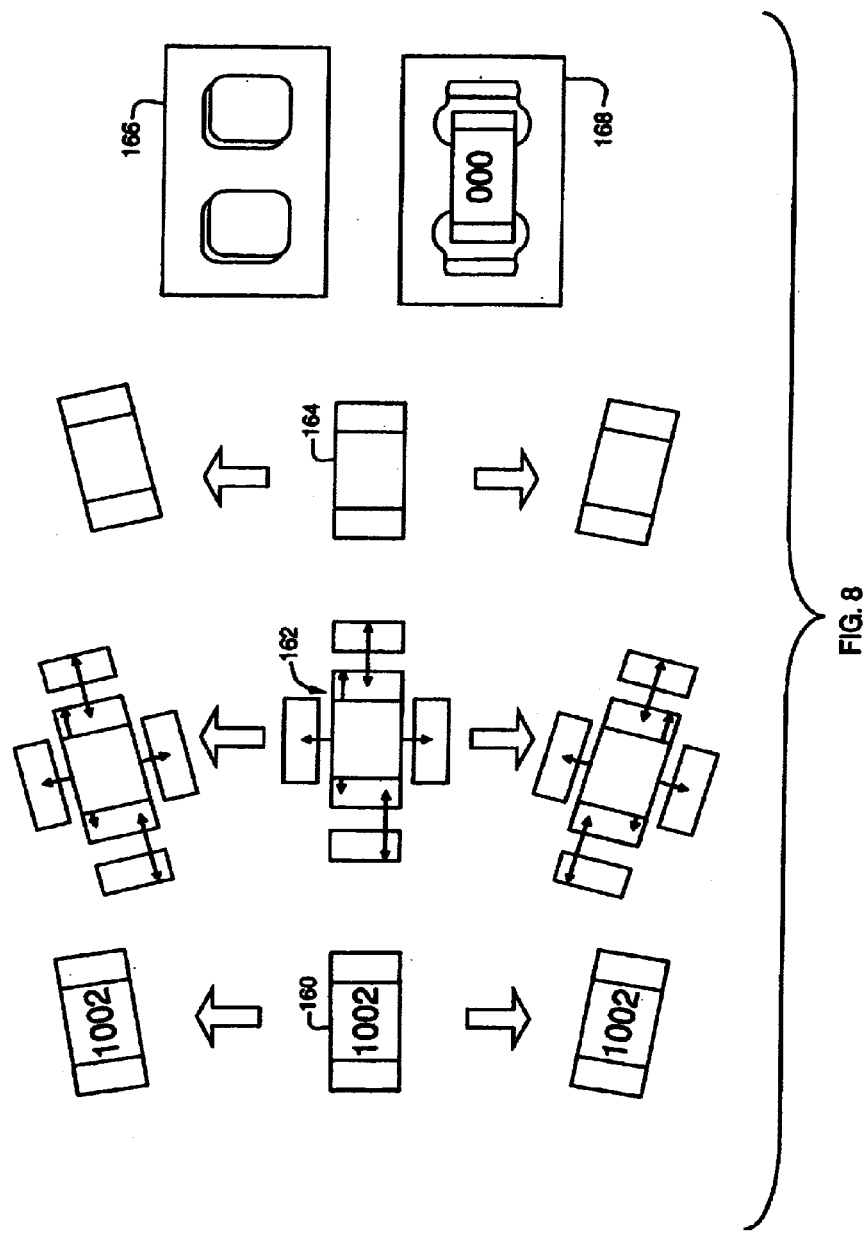
FIG. 8 shows the image structural and geometry models of FIGS. 7 and 7A inflated from an expected angle.

Referring now to FIG. 8, the image, structural, and geometry models 160–164 are inflated from the expected angle of 0 degrees. The term inflation of a model corresponds to the process of generating different but possible variations of the original model. For instance, in a region of interest the part may actually be rotated beyond its designated rotation. Also, the part in reality may be a slightly different size from the default sizes in the database. We can anticipate these variations by creating different instances of the model. Practically, we cannot generate, store, and match a model at every possible rotation or size. In the inflation step we can sample the different possible variations to generate a few models that span each variation space. In this particular example, two new models are generated which are ±10° about the nominal angle. The sampling of each space, such as the space of possible rotations, may change according to the type of part, part size, and the known part tolerances.

Figure 9A:
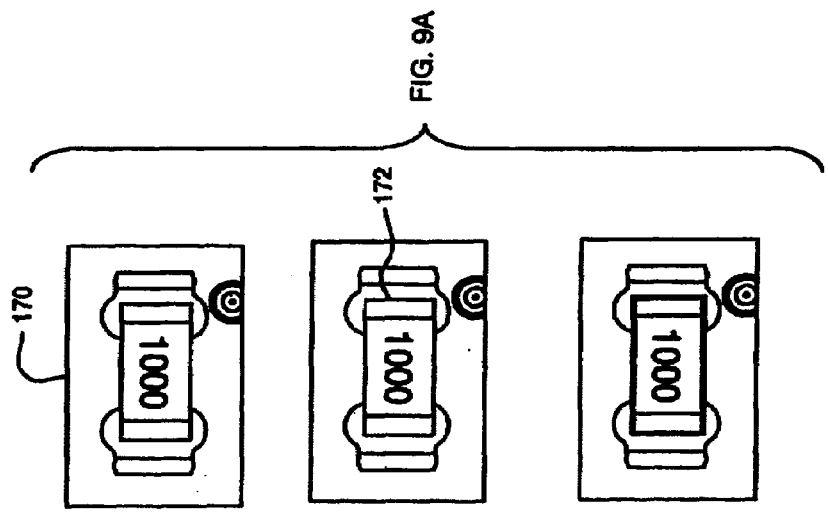
FIGS. 9–9C show image, structural, and geometry models applied to three different cases of inspection.
Figure 9:
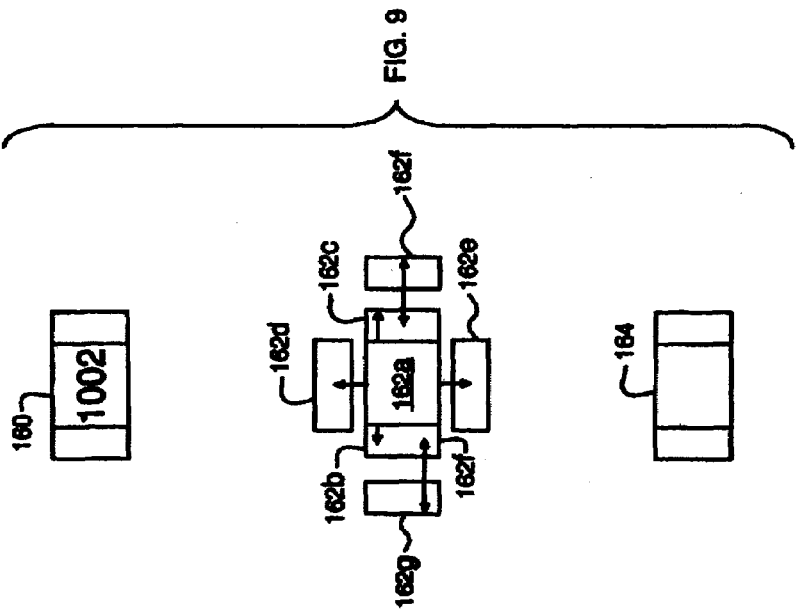
Figure 9C:
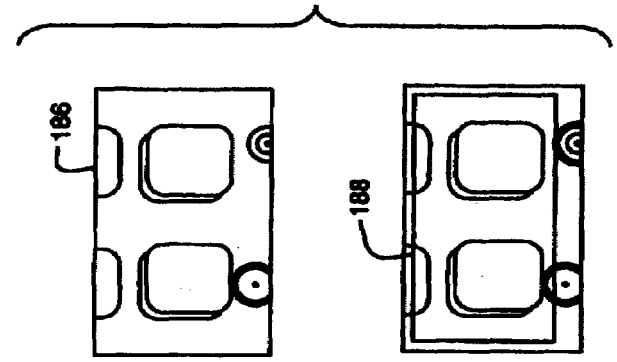
Figure 9B:
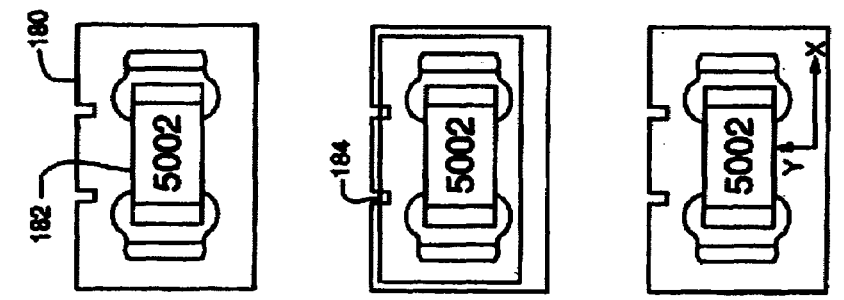

Referring now to FIGS. 9–9C in which the image, structural, and geometry models 160–164 are applied to three different cases of inspection shown in FIGS. 9A–9C respectively. Note that the image model 160 contains a snapshot that is black with white writing and gray endcaps. In the first case, shown in FIG. 9A, there is a good match between the image model 160 and a subregion of image 170 generated or captured by the inspection equipment. The part in image 170 is also black with white writing and gray endcaps. After the image model 160 matches a subregion the captured image 170, the center of the subregion (x,y), corresponding to the center of the part, is saved in the image processing system. (Note that we can refer to a subregion in many different ways, such as referring to its top left hand corner). The current state of the image processing system is that it has a rough hypothesis that the correct part is located around position (x,y) in image 170. The structural model 162 (FIG. 9) is now used to verify that the component 172 is at the noted location (marked by a circle) and to refine the location.

In one embodiment, the structural model 162 verifies the existence of the component at the mark location by placing its collection of regions in a rigid spatial configuration around a location (x, y). If the region and region relation properties are satisfied, the structural model indicates the part is present. In applications with time constraints, it may be desirable to utilize the this embodiment.

In another embodiment, the structural model may actually deform its component parts 162a–162g and spatial positions to align with regions of the component. If the structural model is able to align its regions 162a–162g without deforming any of the regions 162a–162g beyond acceptable limits, then an indication is provided that the part is present. If, on the other hand, the structural model is not able to align its regions 162a–162g without deforming any of the regions 162a–162g beyond acceptable limits, then an indication is provided that the part is not present.

It should be appreciated that the structural model is needed to perform a search around a relatively small area which includes the values (x,y). Such an approach is requited for two reasons: (1) the image model was run in coarse mode, meaning it checked every N'th pixel in the image; and (2) even if the image model was run in fine mode, the image model is extremely sensitive to high contrast regions such as the writing on a part. If the writing is not exactly in the middle of the part, the image model will match not to the part center, but to the center of the writing.

Once the structural model verifies the component is present in the ROI around location (x,y) and refines its center position, the geometry model 166 is applied. As described above in conjunction with FIGS. 1–6, the geometry model is, in essence, a sophisticated edge finder. The geometry model is used to calculate the fine dx, dy and theta values for the component 172. The dx, dy theta values represent the distance and angle by which the component 172 being inspected in the image deviates from expected or ideal positional values for that component as computed via the inspection plan. It should be noted that the dx, dy and theta values are all computed with respect to the center of the component 172. It should be appreciated that the center of the component is calculated differently for different types of components. For circuit components classified as discretes, this is center of the circuit component body and the endcaps. For circuit components classified as IC's only the leads matter in determining dx, dy and theta (the body is uncontrolled).

In the example shown in FIG. 9B, the image model 160 is matched to an image 180 of a component 182 captured by an inspection system during an inspection process. As described above, in this particular example, the image model 160 is black with gray endcaps and the image of the component 182 is green with very bright (saturated endcaps). Thus, the image model 160 is not well matched to the image of the component 182. In this instance, the structural model 162 is used to search a region of interest (ROI) 184 to locate the circuit component 182. If the circuit component 182 is found, then the geometry model is utilized to calculate the fine dx, dy and theta values for that particular circuit component. It should again be noted that the dx, dy and theta values are all computed with respect to the center of the component 182.

In the third example shown in FIG. 9C, the image model is once again not well matched to the image captured by the image inspection equipment. In this case, the image model is not well matched because the circuit component is missing and the pasted pads and circuit board background in image 186 are significantly different in color and luminance form the image model. This indicates to the system that either the component is missing or a component which looks different than the image model is present. Thus, as shown in FIG. 9C, the structural model 162 is again used to search the whole region of interest 186 to find the component. In this particular example, the structural model 162 does not find the circuit component within the region of interest 188 and thus the inspection system determines that the part is absent from the location on the printed circuit board at which it should be found.

It should be noted that in some cases the image model may match well to an image where the component is absent. In this case the pasted pads and background may look very much like the image model snapshot. The same processing as described with FIG. 9B would occur. The structural model would do a search around the most likely center position of the part, provided by the image model. It is unlikely that the image would match the stringent specifications in the structural model. The structural model, thus, would declare the part absent.

Figure 10:
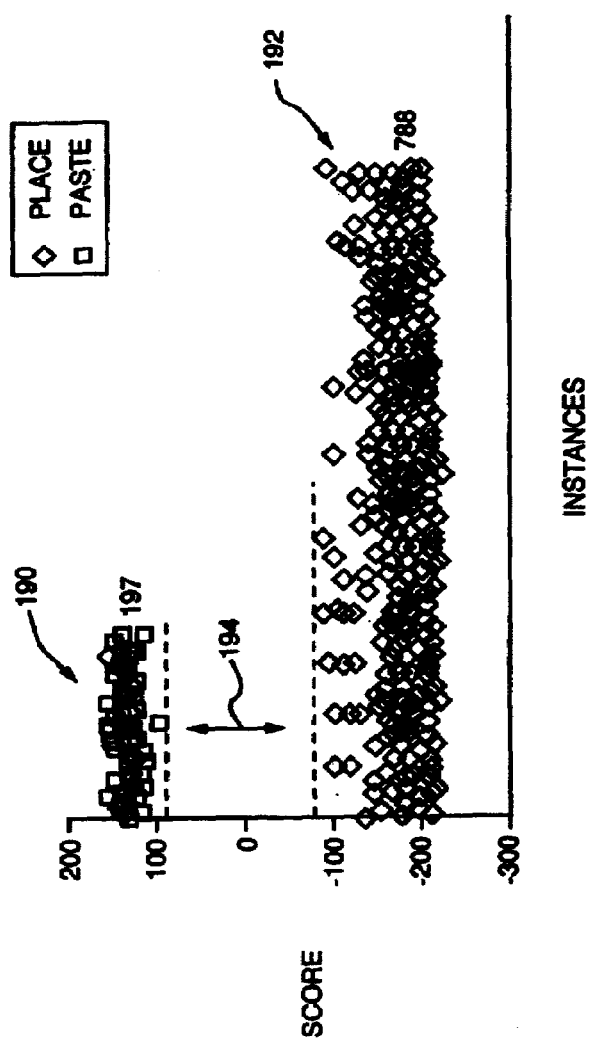
FIGS. 10–10D, are plots of the structural model score on instances of paste and placed images for a package type CC0805.
Figure 10B:
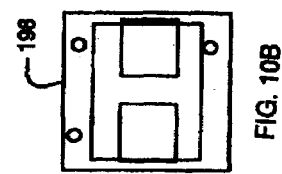
Figure 10D:
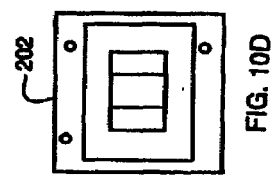
Figure 10A:
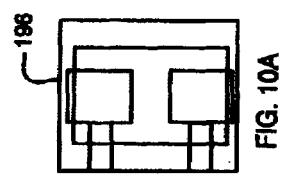
Figure 10C:
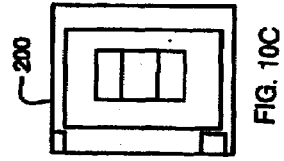

Referring now to FIGS. 10–10D, a plot of the structural model scores on instances of paste and placed images for a parts of a particular package type, CC0805 The plot also indicates whether the instance was identified as having the component present or the component absent. In the plot, two groupings 190, 192 of identification points are shown. Grouping 190 indicates the part was absent and grouping 192 indicates the part was present. In this particular example, the score versus instances indicates that the models were able to accurately distinguish placed parts from paste images. All points in group 190 are true negatives and all points in group 192 are true positives. For instance, in FIGS. 10A and 10B image 196 and image 198 were analyzed by the system correctly labeled as having the part absent because they had scores in group 190. In FIGS. 10C and 10D, images 200 and 202 were analyzed by the system and were correctly labeled as having the part present because they had scores in the group 192. As shown in FIG. 10, there are 197 paste instances and 788 place instances that were analyzed. The wide separation 194 between the paste and placed instances 190, 192 respectively indicates that the system is able to confidently distinguish between these two groups.

Figure 11:
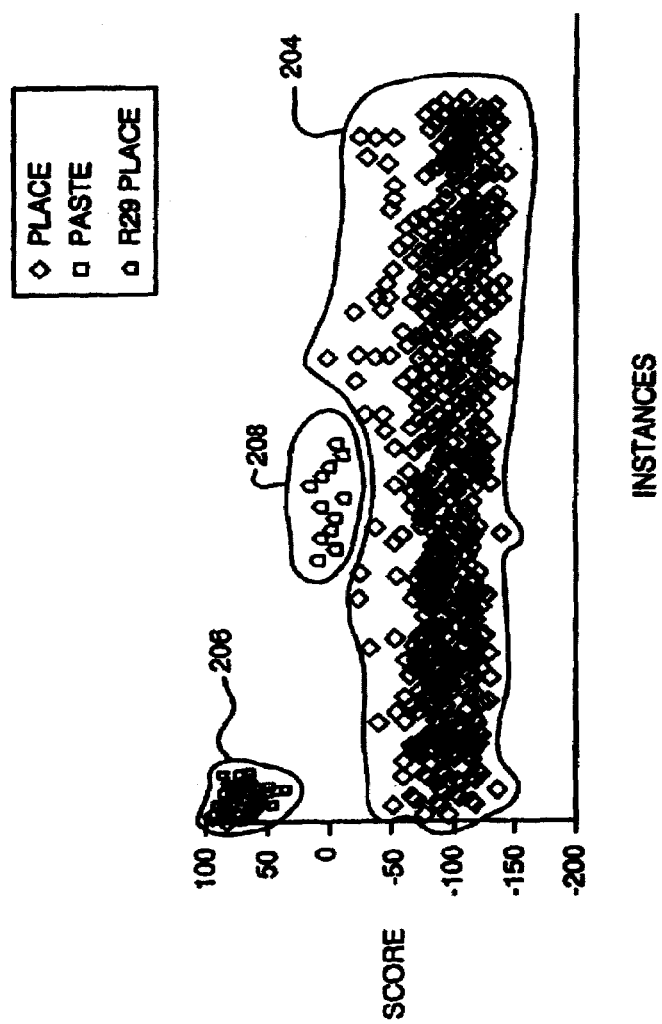
FIGS. 11 and 11A, are plots of structural model score versus instance is shown for a series of placed parts and paste parts of the type RC1206
Figure 11A:
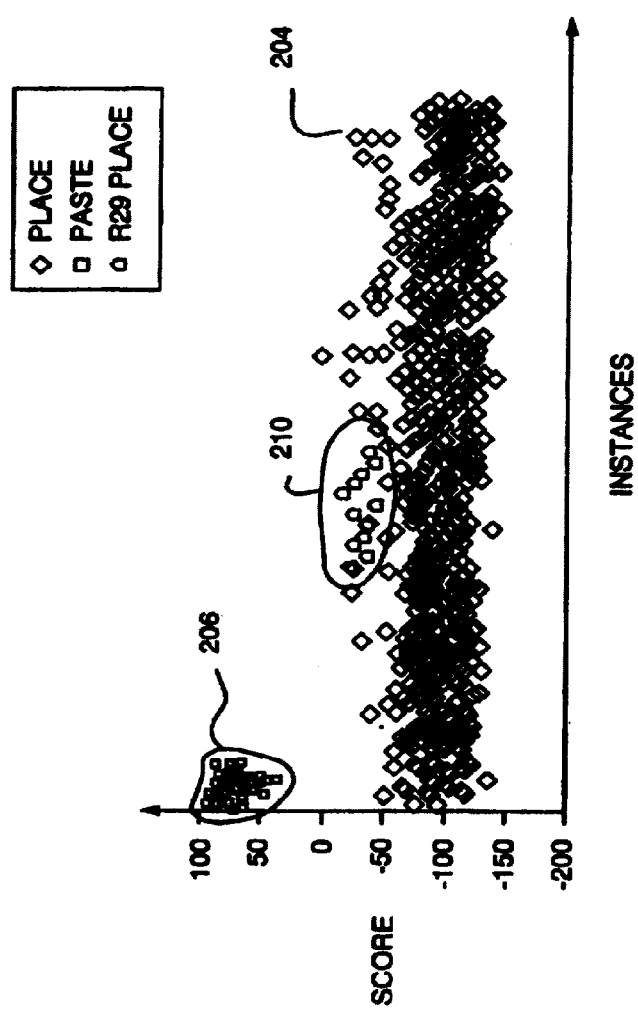

Referring now to FIGS. 11 and 11A, a plot of structural model score versus instance is shown for a series of placed parts and paste parts of package type RC1206. As can be seen from FIG. 11, one placed parts grouping 204 is highly separated from a paste parts grouping 206. Another placed parts grouping 208, however, is in a region which does not have good separation from the paste parts grouping 206 and the placed parts grouping 204 The components which resulted in the grouping 208 are those components which the structural could not confidently identify as placed images.

The results which occur in the region 208 between the lower and upper regions 204, 206 correspond to components which the structural model could not identify as either a paste or a placed part. In this particular example, the package type is a so-called RC1206; a resistor of size 120 by 60 mils. Thus, the particular structural model being used for package type RC1206 are not accurately identifying the set of parts in group 208

The images denoted in group 208 were analyzed to look for any commonality. The resulting analysis found that all images from group 208 were from the particular reference designator R29 on the different instances of the printed circuit board.

Since the structural model being used for package type RC1206 are not accurately identifying a particular part at reference designator R29, a new structural model is generated for this particular part at this particular location on the board Once the new model for package type RC1206 and reference designator R29 is used, as can be seen in FIG. 11A, good separation is achieved between the placed and paste parts as indicated by the position of grouping 210. Group 210 shows the scores generated by the new structural model for the images of placed parts at reference designator R29. Thus, FIG. 11A shows that the identification scores for both the R29 model (group 210) and the non-R29 model (group 206 for paste images and group 204 for placed images) result in good separation between the paste and placed parts.

FIGS. 11 and 11A illustrate that by examining clusters of example images, it is possible to identify components which require specialized or specially trained models for detection and recognition. For example, steps 100–108 described above in conjunction with FIG. 4 illustrate a technique of generating a separation plot, which is a measure of how well the models can discriminate between positive and negative examples, for a set of paste and placed images. FIG. 4 discusses how to choose the best set of models that gives a good separation between paste and placed images.

Note that at the end of the processing in FIG. 11A, we have added a new structural model for part type RC1206. This means that two structural models are associated with this part type. It is possible to use the same process to determine if we what to create a new image or geometry model.

Figure 12:
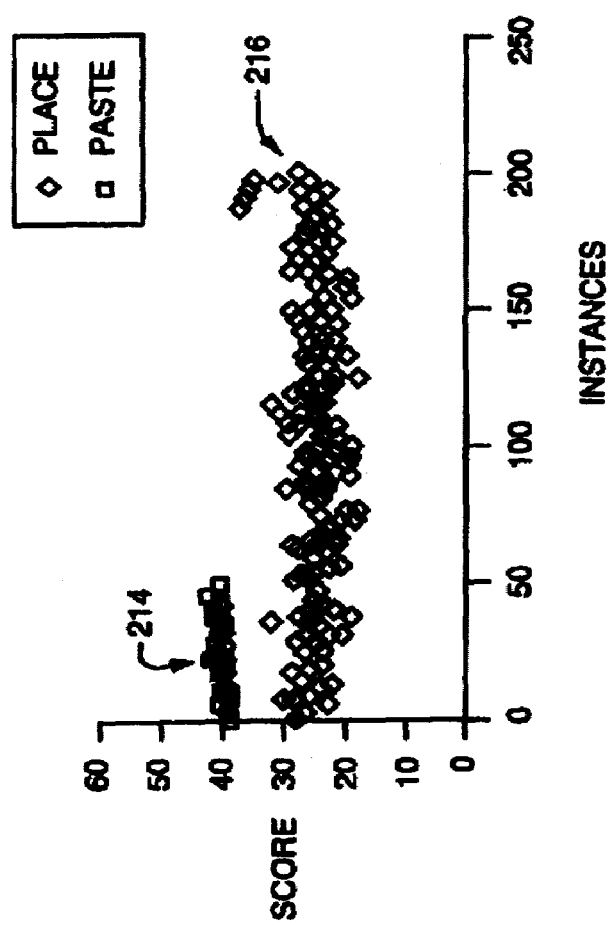
FIG. 12 shows an image model matched to a component identified as an RC0805.

Referring now to FIG. 12, an image model match to a component identified as an RC0805 is shown. Again, in this particular example, there is good separation between the paste and placed part groupings 214, 216 thus indicating that the image model can correctly distinguish between a paste and a placed part. This analysis shows that for this part type, the matching method will most likely follow the flow as described in FIG. 9A where the structural model is used more for verification than part detection and location identification.

Figure 13:
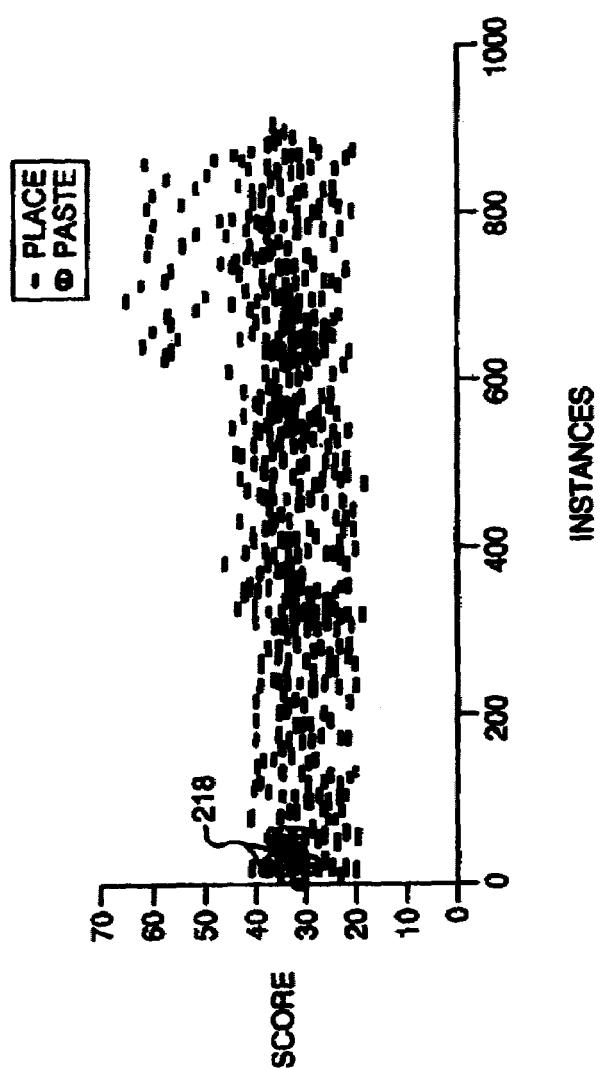
FIG. 13 shows image model scores for paste and place images of the type RC1206.

FIG. 13 shows the image model scores for the paste and place images of the type RC1206. The paste scores are shown as group 218 and the place scores are denoted by dashes in FIG. 13. In contrast to the results achieved in accordance with the techniques of the present invention and with reference to FIG. 13, it should be appreciated that when prior art techniques are used (i.e. using only an image model to identify and distinguish placed and paste regions of a printed circuit board), little or no separation occurs between the paste and placed images as shown in FIG. 13. Note that the process described in the current invention is able to compensate for the limitations of the image model by using the structural model. The structural model does provide a good separation between paste and place images as already shown in FIG. 11A.

This analysis shows that for this part type, the matching method will most likely follow the flow as described in FIGS. 9B and 9C where the structural model is used for part detection and location identification.

Figure 14:
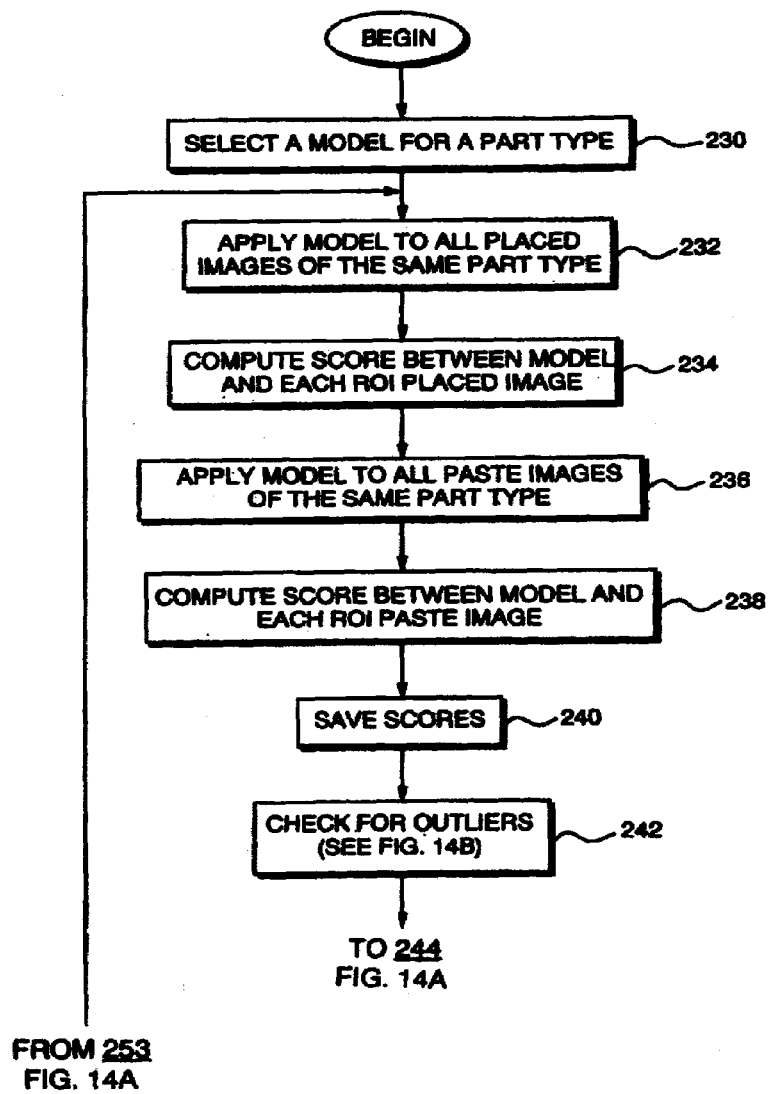
FIGS. 14A–14B show a technique for learning a model or set of models which provides good classification of images for a part type.
FIG. 14C shows a histogram of number of occurrences of scores having two curves fit through the data points.
Figure 14A:
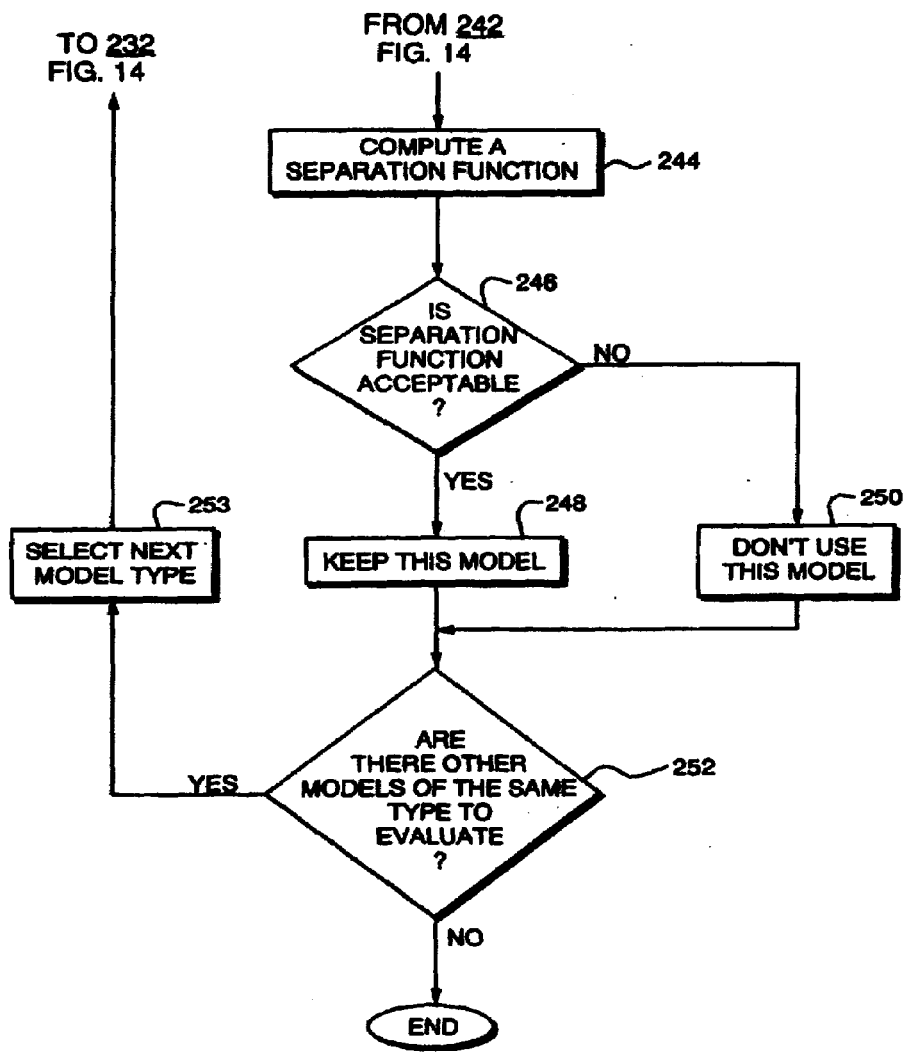
Figure 14B:
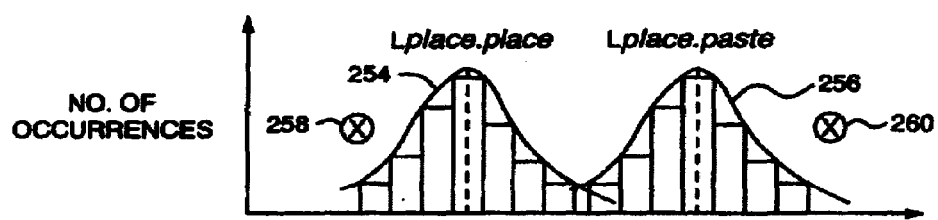

Referring now to FIGS. 14A–14C, a technique for learning a model which provides good classification of images for a part type is shown. The process begins with step 230 in which a model for a part type is selected from a set of model types. The model can be an image model, a structural model or a geometry model. While each of these models may be learned independently, we currently learn an image and a structural model together.

As show in step 232, the model is applied to all "placed images" of the same part type. A "placed image" refers to an image in which the object being inspected is in one of a range of expected locations in the image Processing next proceeds to step 234 where a "placed image score" is computed between the selected model and each "placed image" in the region of interest (ROI). Each "placed image score" is a value which represents or indicates the goodness of the match between the model and a particular placed image.

Processing then proceeds to steps 236 and 238, in which the same model is applied to all paste images of the same part type and a "paste image score" is computed between the selected model and each "paste image" in the region of interest (ROI).

Once the placed image scores and paste image scores are computed they are saved for use in later processing. Next, in step 242 a check for "outlier scores" (or more simply "outliers") is performed. The term "outliers" refer to those placed and paste image scores which appear to be well outside the typical range of values for the placed image scores and the paste image scores. If an outlier is identified, then the reason for the outlier should be determined. That is, if the outlier score occurred due to an anomalous situation or characteristics which is not expected to be repeated, then the outlier point should not be included in a computation of a distribution of the scores. If, on the other hand, the outlier score occurred due to a situation or characteristics which is expected to be repeated, then the outlier point should be included in a computation of a distribution of the scores. For instance, a discrete component with paste on the endcaps will provide a score that is an outlier. We would want to eliminate this score from the set of good placed scores because it is an actual defect. Also, if a placed image is inaccurately labeled, meaning the expected object is not in the image, we would want to remove the score associated with this image from the set of place scores. On the other hand, if a discrete component generally has a black body and there occurs a valid instance of the part with a white body (or a drastically different appearance), we would want to include this valid instance in the distribution of good placed scores Referring briefly to FIG. 14C for example, two histograms of number of occurrences of scores is shown. Each element on the X axis denotes a range of scores. The Y axis denotes the number of appearances of that score or range of scores. Curve 254 corresponds to a gaussian fit to histogram of the placed image scores and curve 256 corresponds to a gaussian fit to the histogram the paste image scores. Point 258 represents an outlier on the placed image score. That is, point 258 corresponds to a point which was not included in the computation used to produce curve 254. Similarly, point 260 represents an outlier on the paste image score and thus point 258 corresponds to a point which was not included in the computation used to produce curve 256.

Referring again to FIGS. 14A and 14B, processing proceeds to step 244 in which a separation function is computed. The manner in which the separation function is computed depends upon a variety of factors including but not limited to the type of model which was selected in step 230, the characteristics of the placed and paste images and the particular type of application in which the model is being used. For, example in an application such as a printed circuit board inspection process where the model corresponds to an image model, the separation function may is generated from scores of a correlation function. The scores may be generated from any model matching method. For instance, the model may be of a face with a complex matching function. The resulting scores may input into the same process to generate a separation function as described in step 244.

The separation function in this case tries to fit a gaussian curve to the positive examples and another gaussian curve to the negative examples. It is possible that one gaussian may not be sufficient to achieve sufficient curve fitting. Several gaussians may thus be required to approximate the data in each class. For instance, the paste examples may produce a bi-modal distribution if the PCB has two very distinct background colors. There are several clustering algorithms, such as K-means, well known to those of ordinary skill in the art that are suitable for this purpose. Another way to compute a separation function is to find the best curve that fits the data. This assumes that we do not know or we are not imposing the distribution function.

Given a new data point, one can lookup the value of the curve at that point. Based on the calculated value and the nature of the distribution, one can compute the probability or likelihood that the data point belongs to that class. In some cases the point may fall in the intersection of two or more distributions. In this case, we can compute how likely the point belongs to each distribution. In the simplest case, we would label the point as belonging to the distribution with the highest likelihood. We can however, report this diagnostic with a low level of confidence.

After the separation function is computed, processing flows to decision block 246 in which decision is made as to whether the separation function is acceptable. Again, the manner in which this decision is made and the factors considered in making the decision depends upon a variety of things. For example, in an application such as a printed circuit board inspection process where the model corresponds to an image model and the separation function includes correlation functions, the decision as to whether the separation function is acceptable may be made by computing the difference between minimum and maximum correlation values and comparing the difference value to a predetermined threshold value.

In other applications, however, the separation function could be how well the relative relations of the regions and the region properties match the structural model or how well a gradient pattern matches an edge model.

It should be appreciated that the process is essentially the same for any application in which a score is generated for positive and negative examples. It is possible, however, to have multiple score outputs. In this case, a gaussian of a higher dimension is required to approximate the data.

If in decision block 246, it is determined that the separation function is acceptable, then processing proceeds to step 248 where the model is stored for further use. If, on the other hand, it is determined in decision block 246 that the separation function is not acceptable, then processing proceeds to step 250 where the model is identified as one that will not be used (or the model can simply be marked as a model that will be disposed of). This "bad" model can be used to benchmark future models.

Processing then proceeds to step 252 where decision is made as to whether any other models of the same type to evaluate exist. If there are no more such models, then processing ends. If, on the other hand, it is determined in decision block 252 that other models of the same type to evaluate do exist, then processing flows to step 253 in which the next model type is selected and then processing flows back to step 232. At step 232, the processing steps described above are again repeated.

The question whether there are any other models may be interpreted several ways. In the most limited scope, the question is asking whether there are any other models of the same type. For instance, if the model type is an image model, then the question is are there any other correlation images to be tried against all the data. If the question is asking whether there are any other models for that part or part type, the next model type could be a structural or geometry model.

The learning method or decision function generator as described in FIGS. 14–14B is a method that uses all true positives and true negatives that are available. This decision function may be refined over time as new examples are seen. The refinement of the model may occur, for instance, in the background learning step of module 70 in FIG. 2.

This learning method is different from that described in FIGS. 3A and 4. This method uses all data available to generate the models. FIGS. 3A and 4 are focused on getting the most representative data to train the models.

It should be noted that in FIGS. 1 and 14B only two types of diagnosis are assumed to be available: part there, part not there. We may, however, have other classes that we would like to represent such as part damaged, wrong part, paste smudged. We can either compute a distribution of scores for each of these labeled images or generate a more complex function to classify a new image, if the new measured image falls in between the true placed and the true placed.

Having described preferred embodiments of the invention, it will now become apparent to one of ordinary skill in the art that other embodiments incorporating their concepts may also be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. An inspection system comprising:
   (a) a database having stored therein an object library;
   (b) an inspection plan generator coupled to receive information from said database and for generating an inspection plan;
   (c) an image processing system including an image capture processor and an image processor; and
   (d) an inspection module, coupled to said image processing system, said inspection module including:
      a learn model processor for learning and saving attributes about the appearance of objects and for generating image, structural and geometric models from data gathered;
      an image model processor for applying an image model to detect image properties of an object;
      a structural model processor for applying a structural model to determine structural features of the object; and
      a geometric model processor for applying a geometric model to detect geometric properties of the object.

2. The system of claim 1 wherein said image model processor comprises:
   means for applying the image model to an image of an object being inspected to determine if the object a being inspected looks like objects that have been seen in the past.

3. The system of claim 2 wherein the at least one attribute corresponds to one of color or luminance.

4. The system of claim 3 wherein said image model comprises at least one attribute arranged in a fixed spatial manner.

5. The system of claim 1 wherein said structural model processor comprises:
   means for applying said structural model to an image of an object being inspected to determine whether a object exists in the image that has the same structure as that encoded in said structural model.

6. The system of claim 5 wherein said structural model comprises:
   a set of regions; and
   a set of relations between predetermined ones of the set of regions.

7. The system of claim 6 wherein a set of relations included in the structural model includes relative color relations between predetermined regions of the structural model.

8. The system of claim 1 wherein said geometric model processor comprises:
   means for applying the geometric model to an image of an object being inspected to determine object placement details.

9. The system of claim 8 wherein said means for applying the geometric model to an object comprises means for searching for one or more edges or one or more gradient regions of the object with the constraint that the pattern of the one or more gradients match a top level configuration.

10. The system of claim 9 wherein said geometric model utilizes gradients in at least one of luminance or color to precisely locate the object being inspected.

11. The system of claim 9 wherein said means for searching includes means for simultaneously searching for one or more edges or one or more gradient regions of the object.

12. The system of claim 1 wherein said inspection module is adapted to update one or more of predetermined image, structural and geometric models with models generated by said learn model processor.

13. The system of claim 12 wherein said new model or set of models include at least one of an image model, a structural model and a geometry model for an object being inspected.

14. The system of claim 1 wherein said inspection module comprises:
   a background model processor for learning and saving attributes about the appearance of objects and for generating image, structural and geometric models from data gathered during an inspection process; and
   wherein said inspection module is adapted to dynamically update one or more of predetermined image, structural and geometric models with models generated by said background model processor.

15. The system of claim 14 wherein in response to a new model or set of models being learned for an object, said inspection module substitutes one or more of said new model or set of models for a corresponding model or models in the inspection plan.

16. The system of claim 1 further comprising a theta estimator for reducing the range of angles over which a model is applied.

17. The inspection system of claim 1, wherein:
   said image model processor applies the image model to determine a presence of the object within a region of interest; and
   said geometric model processor applies the geometric model to determine a precise location of the object.

18. The inspection system of claim 1, wherein:
said inspection module combines outputs from the image, structural, and geometric model processors to make a determination about the object.

19. The inspection system of claim 1, further comprising:
a inspection module that combines outputs from the image, structural, and geometric model processors to make a determination about the object.

20. A method for inspecting an object comprising the steps of:
  (a) applying a first model having a first set of attributes to a region of interest around the object, wherein the step of applying the first model comprises the step of applying an image model to the region of interest to detect image properties of the object;
  (b) applying a second model to the region of interest around the object, wherein the second model has a second set of attributes, wherein the second set of attributes differs from the first set of attributes by at least one attribute, wherein the step of applying the second model comprises the step of applying a structural model to the region of interest to determine structural features of the object; and
  (c) applying a third model to the region of interest around the object, wherein the step of applying the third model comprises the step of applying a geometry model to the region of interest to detect geometric properties of the object.

21. The method of claim 20 wherein:
the first model corresponds to one of an image model and a structural model; and
the second model corresponds to one of a structural model and a geometry model.

22. The method of claim 20 wherein the step of applying the first model reduces the number of parameters considered by the second model.

23. The method of claim 22 wherein the parameters are rotation and translation of the object.

24. The method of claim 20 wherein the step of applying an image model comprises the step of applying the image model to a region to determine if an object being inspected looks like objects on which the model has been trained.

25. The method of claim 20 wherein the step of applying a structural model comprises the step of applying the structural model to determine whether an object exists in the region of interest that has the same structure as that encoded in the structural model.

26. The method of claim 20 wherein the step of applying a geometry model comprises the step of applying the geometry model to precisely locate the object and to provide detailed information concerning the placement of the object.

27. The method of claim 20 further comprising the steps of:
  (d) prior to applying the first model, annotating a package library;
  (e) generating an inspection plan;
  (f) implementing a learning process;
  (g) applying the first model to a test data set; and
  (h) applying the second model to the test data set.

28. The method of claim 27 further comprising the step of applying a third model to the test data set.

29. The method of claim 27 wherein said learning process comprises the steps of:
  selecting from a set of model types at least one model for an object type;
  applying each of the at least one models to one or more placed images of the same object type;
  computing a placed image score between each of the one or more selected models and each placed image in a region of interest;
  applying each of the one or more models applied to the placed images of the same object type to all paste images of the same object type;
  computing a paste image score between each of the one or more models and each paste image in the region of interest;
  computing a separation function to provide an indication of the effectiveness of the model; and
  in response to the separation function providing an indication that the model is effective, saving the model for later use.

30. An inspection system comprising:
  (a) an image processing system;
  (b) an image model processor adapted to cooperate with said image processing system, said image model processor applying an image model to determine image properties of an object;
  (c) a structural model processor adapted to cooperate with said image processing system, said structural model processor applying a structural model to determine structural features of the object;
  (d) a geometric model processor adapted to cooperate with said image processing system, said geometric model processor applying a geometric model to determine geometric properties of the object; and
  (e) a learn model processor, adapted to cooperate with said image processing system, said learn model processor for learning and saving attributes about the appearance of objects and for providing structural and geometric models from data gathered during an inspection process.

31. The inspection system of claim 30 wherein said learn model processor provides structural and geometric models by updating existing structural and geometric models with attributes generated by said learn model processor.

32. The inspection system of claim 31 wherein said structural model processor reduces the number of parameters considered by said geometric model processor.

33. The inspection system of claim 31 wherein said learn model processor evaluates a plurality of values for a plurality of parameters in each of a structural model and a geometric model and said learn model processor determines which set of values provides an acceptable separation function.

34. The inspection system of claim 30, wherein:
said image model processor applies the image model to determine a presence of the object within a region of interest; and
said geometric model processor applies the geometric model to determine a precise location of the object.

* * * * *